(12) United States Patent
Lee et al.

(10) Patent No.: US 10,936,101 B2
(45) Date of Patent: Mar. 2, 2021

(54) TOUCH DISPLAY DEVICE, DISPLAY CONTROLLER, DRIVING CIRCUIT, AND DRIVING METHOD

(71) Applicant: LG Display Co., Ltd., Seoul (KR)

(72) Inventors: SungHoon Lee, Gyeongsangbuk-do (KR); Seungmok Shin, Daegu (KR); HoonBae Kim, Seoul (KR); SunYeop Kim, Seoul (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 16/453,271

(22) Filed: Jun. 26, 2019

(65) Prior Publication Data

US 2020/0004367 A1    Jan. 2, 2020

(30) Foreign Application Priority Data

Jun. 28, 2018 (KR) .................. 10-2018-0074982

(51) Int. Cl.
*G06F 3/041* (2006.01)
*G06F 3/0354* (2013.01)
*G06F 3/047* (2006.01)

(52) U.S. Cl.
CPC ........ *G06F 3/0412* (2013.01); *G06F 3/03545* (2013.01); *G06F 3/047* (2013.01); *G06F 3/0416* (2013.01)

(58) Field of Classification Search
CPC .. G06F 3/0412; G06F 3/03545; G06F 3/0416; G06F 3/047
USPC ........................................................ 345/173
See application file for complete search history.

(56) References Cited

U.S. PATENT DOCUMENTS

| | | | |
|---|---|---|---|
| 2016/0306447 A1* | 10/2016 | Fleck | G06F 3/03545 |
| 2017/0024077 A1* | 1/2017 | Lin | G06F 3/0412 |
| 2017/0102825 A1* | 4/2017 | Kim | G06F 3/0412 |
| 2018/0024654 A1* | 1/2018 | Koike | G09G 3/20 345/174 |
| 2019/0179475 A1* | 6/2019 | Seo | G06F 3/044 |

* cited by examiner

*Primary Examiner* — Chanh D Nguyen
*Assistant Examiner* — Ngan T. Pham-Lu
(74) *Attorney, Agent, or Firm* — Seed IP Law Group LLP

(57) ABSTRACT

A touch display device, a display controller, a driving circuit, and a driving method. Even in the case that a rate (or an input cycle) at which an image supply device supplies image data is not synchronized with a rate (or a beacon cycle) at which a beacon signal for pen sensing is output to the display panel, display processing and touch sensing (e.g., pen sensing or finger sensing) is performed ordinarily by controlling data output processing.

25 Claims, 25 Drawing Sheets

FIG.9
TDS
(Case 1)　TDS1　
(Case 2)　TDS2　────────
(Case 3)　TDS3　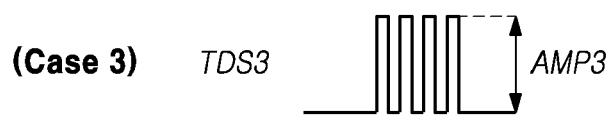

TOUCH DISPLAY DEVICE, DISPLAY CONTROLLER, DRIVING CIRCUIT, AND DRIVING METHOD

CROSS REFERENCE TO RELATED APPLICATION

This application claims priority to Korean Patent Application No. 10-2018-0074982, filed on Jun. 28, 2018, which is hereby incorporated by reference for all purposes as if fully set forth herein.

BACKGROUND

Technical Field

Exemplary embodiments relate to a touch display device, a display controller, a driving circuit, and a driving method.

Description of Related Art

With the development of the information society, there has been an increasing demand for image display devices. In this regard, a range of display devices, such as liquid crystal display (LCD) devices, plasma display devices, and organic light-emitting diode (OLED) display devices, have recently come into widespread use.

Among such display devices, touch display devices provide touch-based user interfaces enabling users to intuitively and conveniently input data or instructions directly to devices, rather than using conventional data input systems, such as buttons, a keyboard, or a mouse.

Touch display devices must be able to provide not only image display, but also touch sensing for detecting a touch performed by a user with a finger, a pen, etc. Accordingly, in touch display devices, driving timing for image display must be properly matched to driving timing for the touch sensing for detecting a touch performed by a user using a finger, a pen, etc. Otherwise, image quality may be degraded, and the touch sensing may not be performed normally or ordinarily, which are problematic.

BRIEF SUMMARY

Various aspects of the present disclosure provide a touch display device, a display controller, a driving circuit, and a driving method, in which driving timing for display processing and driving timing for touch sensing for detecting a touch performed by a user using a finger, a pen, etc., are properly synchronized, so that the display processing and the touch sensing can be performed ordinarily.

Also provided are a touch display device, a display controller, a driving circuit, and a driving method, in which the display processing and the touch sensing (e.g., pen sensing or finger sensing) can be performed ordinarily even in the case that a rate (or an input cycle) at which an image supply device supplies image data is not synchronized with a rate (or a beacon cycle) at which a beacon signal for pen sensing is output to the display panel.

Also provided are a touch display device, a display controller, a driving circuit, and a driving method, in which the display processing and the touch sensing (e.g., pen sensing or finger sensing) can be performed ordinarily, even in the case that the rate (or the input cycle) at which the image supply device supplies image data is not synchronized with a rate (or an output cycle) at which data signals are output to the display panel for the display operation.

Also provided are a touch display device, a display controller, a driving circuit, and a driving method, in which the pen sensing and the display processing can be performed ordinarily in a case in which the display processing and the touch sensing are performed independently of each other (or in a case in which the display processing and the touch sensing are simultaneously performed, if desired).

According to an aspect of the present disclosure, a touch display device may include: a display panel in which a plurality of data lines, a plurality of gate lines, and a plurality of touch electrodes are disposed; a gate driving circuit electrically connected to the display panel, the gate driving circuit sequentially outputting gate signals to the plurality of gate lines to drive the plurality of gate lines; a data driving circuit electrically connected to the display panel, the data driving circuit receiving output image data, in a form of digital signals, converting the output image data into analog data signals, and outputting the analog data signals to the plurality of data lines to drive the plurality of data lines; and a touch driving circuit outputting a beacon signal, directed to one or more pens in contact with or adjacent to the display panel, to one or more touch electrodes among the plurality of touch electrodes.

The a touch display device may further include a display controller storing input image data in a memory and outputting the output image data, corresponding to the input image data stored in the memory, to the data driving circuit.

The touch driving circuit may output a first beacon signal during a first beacon transmission period, a second beacon signal during a second beacon transmission period, and a third beacon signal during a third beacon transmission period, according to a predetermined beacon cycle.

The display controller may receive first input image data, second input image data, and third input image data, input thereto as the input image data, according to an input cycle corresponding to a different value from the beacon cycle, and output first output image data, second output image data, and third output image data corresponding to the first input image data, the second input image data, and the third input image data, respectively.

The display controller may output the first output image data between the first beacon transmission period and the second beacon transmission period.

The display controller may output the second output image data, re-output the first output image data, or hold data output processing between the second beacon transmission period and the third beacon transmission period.

If the first output image data is re-output or the data output processing is held between the second beacon transmission period and the third beacon transmission period, the display controller may output the second output image data and the third output image data according to an output cycle corresponding to the beacon cycle after the third beacon signal is output.

If the display controller holds the data output processing between the second beacon transmission period and the third beacon transmission period, the gate driving circuit may turn the plurality of gate lines off.

If the display controller re-outputs the first output image data between the second beacon transmission period and the third beacon transmission period, the gate driving circuit may sequentially turn the plurality of gate lines on.

The input cycle may be defined as a value greater than the beacon cycle.

The beacon cycle may correspond to an interval of blank periods.

The touch driving circuit may output the first beacon signal, the second beacon signal, and the third beacon signal in a first blank period, a second blank period, and a third blank period, respectively.

The beacon signal may be a pulse-modulated signal, including a plurality of pulses, and in which information for pen sensing is expressed.

The touch driving circuit may output a fourth beacon signal and a fifth beacon signal at different timing from the first beacon signal, the second beacon signal, and the third beacon signal, and may supply a direct current voltage to the one or more touch electrodes among the plurality of touch electrodes between a fourth beacon transmission period in which the fourth beacon signal is output and a fifth beacon transmission period in which the fifth beacon signal is output.

While the touch driving circuit is supplying the direct current voltage to the one or more touch electrodes among the plurality of touch electrodes, the touch driving circuit may receive one or more pen signals output from the one or more pens via the display panel.

Between the fourth beacon transmission period and the fifth beacon transmission period, the touch driving circuit may supply a driving synchronization signal to the one or more touch electrodes among the plurality of touch electrodes before supplying the direct current voltage to the one or more touch electrodes among the plurality of touch electrodes.

The driving synchronization signal may be a ping signal including one or more pulses having a predetermined pulse width.

During a period between the first beacon transmission period and the second beacon transmission period, the display controller may output the first output image data to the data driving circuit, the display controller may convert the first output image data, in a form of digital signals, into analog first data signals, and output the analog first data signals to the plurality of data lines, and the touch driving circuit may output a touch electrode driving signal, varying or swinging with a predetermined amplitude, to the one or more touch electrode among the plurality of touch electrodes.

During the period between the first beacon transmission period and the second beacon transmission period, the first data signals may have a voltage changed by a value equal to the amplitude of the touch electrode driving signal.

During the period between the first beacon transmission period and the second beacon transmission period, the gate driving circuit may sequentially output the gate signals to the plurality of gate lines. A turn-off signal portion of each of the gate signals may be a modulated turn-off gate voltage varying or swinging with the amplitude of the touch electrode driving signal, and a turn-on signal portion of each of the gate signals may be a modulated turn-on gate voltage swinging with the amplitude of the touch electrode driving signal.

According to another aspect, a touch display device may include: a display panel in which a plurality of data lines, a plurality of gate lines, and a plurality of touch electrodes are disposed; a gate driving circuit electrically connected to the display panel, the gate driving circuit sequentially outputting gate signals to the plurality of gate lines to drive the plurality of gate lines; a data driving circuit electrically connected to the display panel, the data driving circuit receiving output image data, in a form of digital signals, converting the output image data into analog data signals, and outputting the analog data signals to the plurality of data lines to drive the plurality of data lines; and a touch driving circuit outputting a beacon signal to one or more touch electrodes among the plurality of touch electrodes.

The touch driving circuit may output a beacon signal in every blank period between active periods, in which images are displayed.

The data driving circuit may hold output of the data signals or repeatedly outputs the data signals, having already been output in a previous active period, during one or more active periods among two or more active periods.

According to another aspect, provided is a display controller of a touch display device. The touch display device includes a display panel in which a plurality of data lines, a plurality of gate lines, and a plurality of touch electrodes are disposed, and a data driving circuit driving the plurality of data lines. The display controller may include: a data input section receiving first input image data, second input image data, and third input image data according to a predetermined input cycle; a memory storing the first input image data, the second input image data, and the third input image data; and a data output section outputting first output image data, second output image data, and third output image data, corresponding to the first input image data, the second input image data, and the third input image data, to the data driving circuit.

The input cycle may be defined as a value different from a beacon cycle in which a beacon signal is output to one or more touch electrodes among the plurality of touch electrodes disposed in the display panel.

The beacon signal may be a signal directed to one or more pens in contact with or adjacent to the display panel.

The data output section may ordinarily perform data output processing, re-output data, or hold the data output processing according to the status of the memory.

The data output section may output the first output image data between a first beacon transmission period in which a first beacon signal is output to the display panel and a second beacon transmission period in which a second beacon signal is output to the display panel.

the data output section may output second output image data between the second beacon transmission period in which the second beacon signal is output to the display panel and a third beacon transmission period in which a third beacon signal is output to the display panel.

Alternatively, the data output section may hold data output processing or re-output the first output image data between the second beacon transmission period in which the second beacon signal is output to the display panel and a third beacon transmission period in which a third beacon signal is output to the display panel.

The data output section may output the second output image data and the third output image data according to an output cycle corresponding to the beacon cycle after the third beacon signal is output.

The beacon cycle may be defined to be smaller than the input cycle.

According to another aspect, a driving circuit may include: a data driving circuit receiving output image data, in a form of digital signals, converting the output image data into analog data signals, and outputting the analog data signals to the plurality of data lines to drive a plurality of data lines disposed in a display panel; and a touch driving circuit outputting a beacon signal, directed to one or more pens in contact with or adjacent to the display panel, to one or more touch electrodes among the plurality of touch electrodes disposed in the display panel.

The touch driving circuit may output a first beacon signal during a first beacon transmission period, a second beacon signal during a second beacon transmission period, and a third beacon signal during a third beacon transmission period, according to a predetermined beacon cycle.

The data driving circuit may output first data signals between the first beacon transmission period and the second beacon transmission period.

The data driving circuit may output second data signals following the first data signals, re-outputs the first data signals, or holds data output processing between the second beacon transmission period and the third beacon transmission period.

If the first data signals are re-output or the data output processing is held between the second beacon transmission period and the third beacon transmission period, the data driving circuit may output the second data signals following the first data signals according to an output cycle corresponding to the beacon cycle after the third beacon signal is output.

The touch driving circuit may output a fourth beacon signal and a fifth beacon signal in different timing from the first beacon signal, the second beacon signal, and the third beacon signal, and may supply a direct current voltage to the one or more touch electrodes among the plurality of touch electrodes between a fourth beacon transmission period in which the fourth beacon signal is output and a fifth beacon transmission period in which the fifth beacon signal is output.

During a period between the first beacon transmission period and the second beacon transmission period, the data driving circuit may output the first data signals to the plurality of data lines, and the touch driving circuit may output a touch electrode driving signal, swinging with a predetermined amplitude, to the one or more touch electrodes among the plurality of touch electrodes.

During a period between the first beacon transmission period and the second beacon transmission period, the first data signals may have a voltage changed by a value equal to the amplitude of the touch electrode driving signal.

According to another aspect, provided is a method of driving a touch display device. The touch display device includes a display panel in which a plurality of data lines, a plurality of gate lines, and a plurality of touch electrodes are disposed. The method may include: outputting a first beacon signal, directed to one or more pens in contact with or adjacent to the display panel, to one or more touch electrodes among the plurality of touch electrodes; outputting first data signals to the plurality of data lines after the first beacon signal is output; outputting a second beacon signal to the one or more touch electrodes among the plurality of touch electrodes after the first beacon signal is output; and after the second beacon signal is output, outputting second data signals, following the first data signals, to the plurality of data lines, re-outputting the first data signals to the plurality of data lines, or holding data output processing.

According to exemplary embodiments, the touch display device, the display controller, the driving circuit, and the driving method can properly synchronize the driving timing for the display processing and the driving timing for the touch sensing for detecting a touch performed by a user using a finger, a pen, etc., so that the display processing and the touch sensing can be performed ordinarily.

According to exemplary embodiments, the touch display device, the display controller, the driving circuit, and the driving method can ordinarily perform the display processing and the touch sensing (e.g., pen sensing or finger sensing) even in the case that a rate (or an input cycle) at which an image supply device supplies image data is not synchronized with a rate (or a beacon cycle) at which a beacon signal for the pen sensing is output to the display panel.

According to exemplary embodiments, the touch display device, the display controller, the driving circuit, and the driving method can ordinarily perform the display processing and the touch sensing (e.g., pen sensing or finger sensing), even in the case that the rate (or the input cycle) at which the image supply device supplies image data is not synchronized with a rate (or an output cycle) at which data signals are output to the display panel for the display operation.

According to exemplary embodiments, the touch display device, the display controller, the driving circuit, and the driving method can ordinarily perform the pen sensing and the display processing in a case in which the display processing and the touch sensing are performed independently of each other (or in a case in which the display processing and the touch sensing are simultaneously performed, if desired).

BRIEF DESCRIPTION OF THE SEVERAL VIEWS OF THE DRAWINGS

The above and other objects, features, and advantages of the present disclosure will be more clearly understood from the following detailed description, taken in conjunction with the accompanying drawings, in which:

FIG. 9 illustrates touch electrode driving signals according to the three cases of time-free driving in the touch display device according to exemplary embodiments;

DETAILED DESCRIPTION

Figure 1:
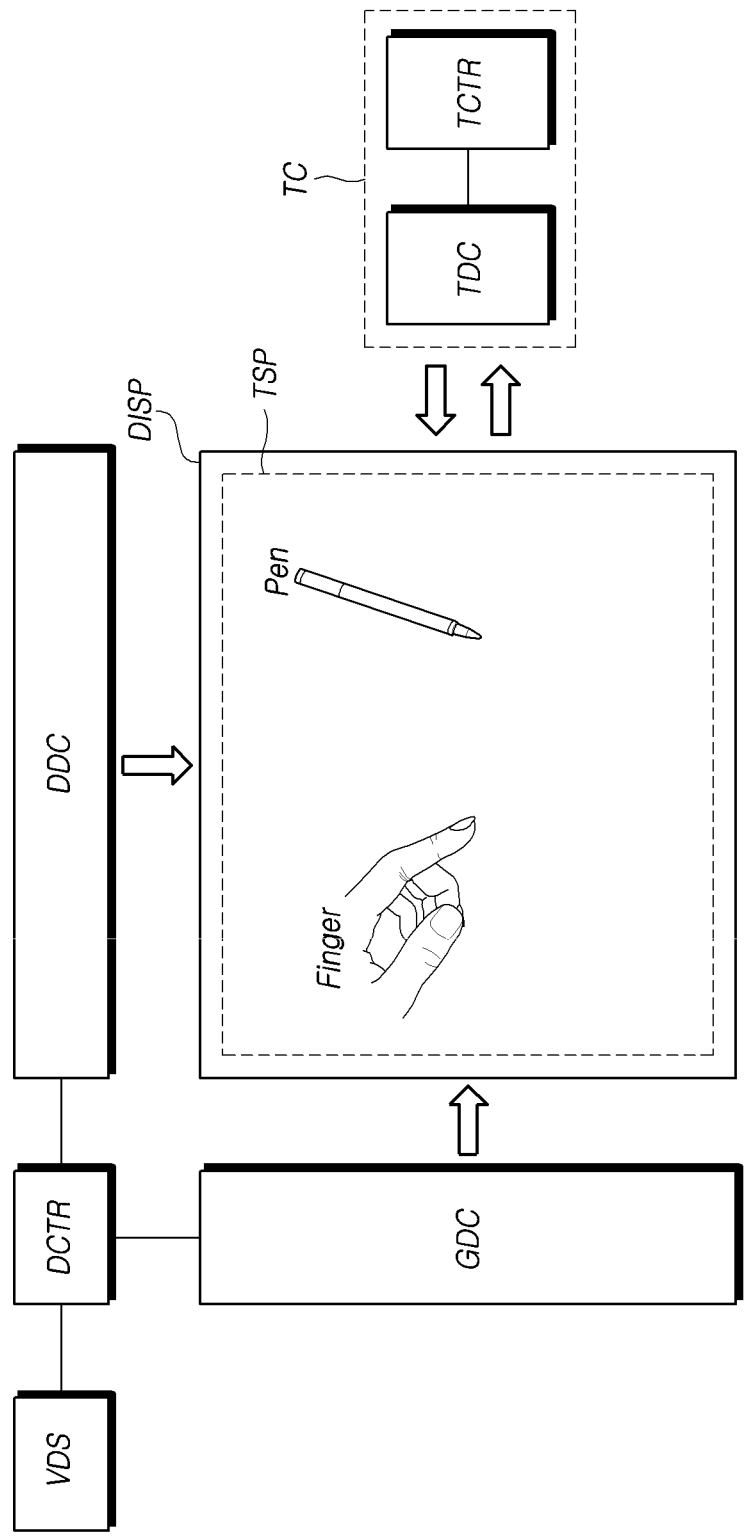
FIG. 1 illustrates a schematic system configuration of a touch display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element.

Figure 2:
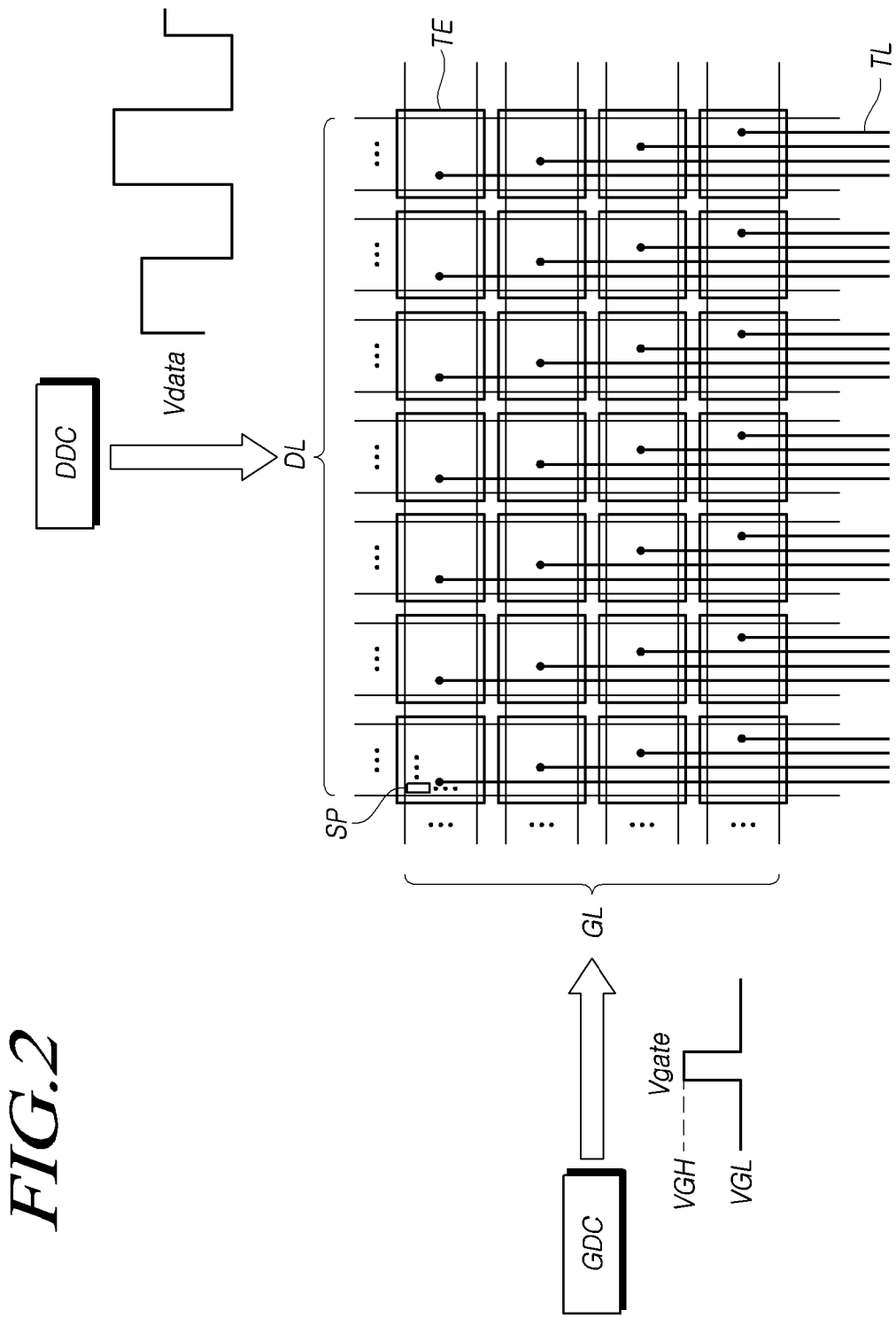
FIG. 2 schematically illustrates display driving of the touch display device according to exemplary embodiments.
Figure 3:
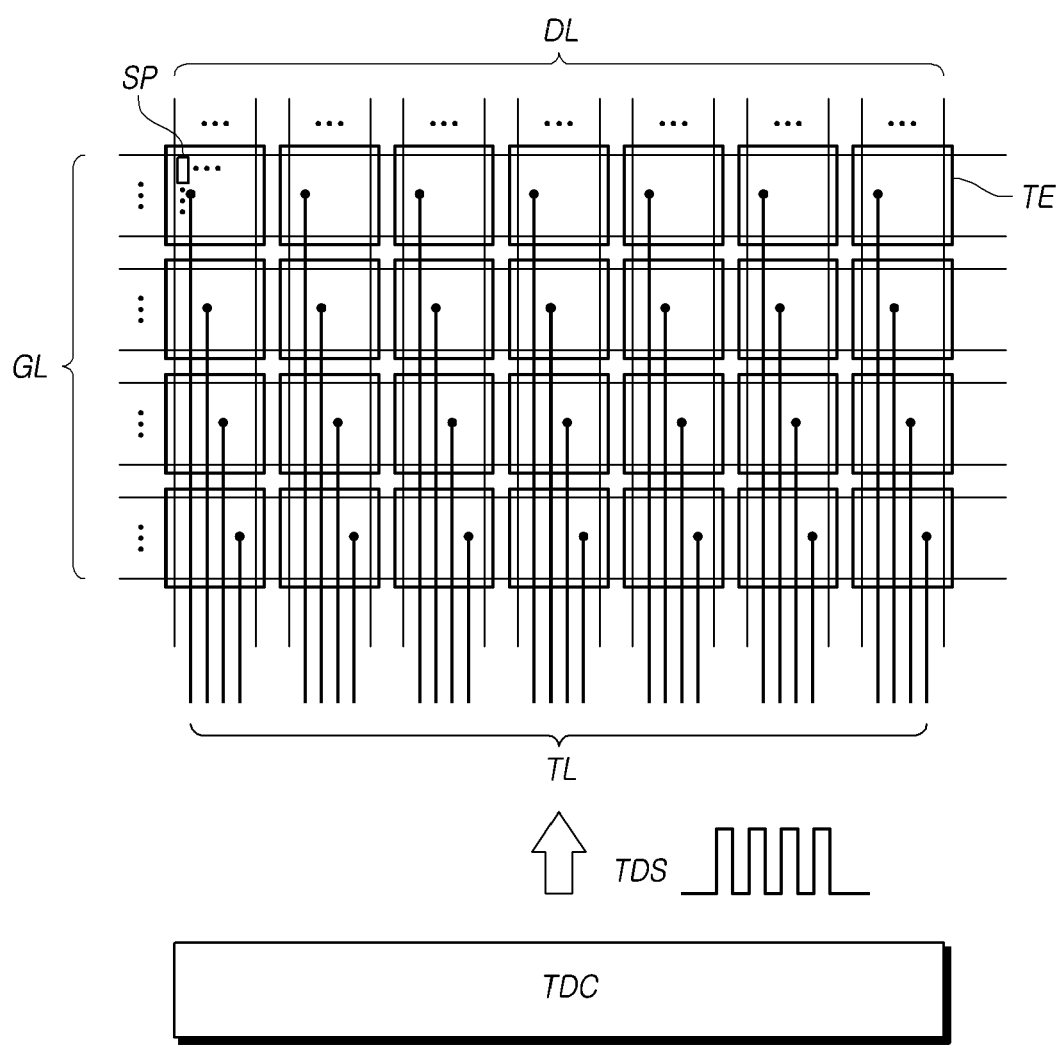
FIG. 3 schematically illustrates touch driving of the touch display device according to exemplary embodiments.

FIG. 1 illustrates a schematic system configuration of a touch display device according to exemplary embodiments, FIG. 2 schematically illustrates display driving of the touch display device according to exemplary embodiments, and FIG. 3 schematically illustrates touch driving of the touch display device according to exemplary embodiments.

Referring to FIG. 1, the touch display device according to exemplary embodiments may provide a display function to display images. In addition, the touch display device according to exemplary embodiments may provide a touch sensing function to detect at least one of a finger or a pen and a touch input function to perform input processing in response to at least one of a finger touch or a pen touch, using the result of detecting at least one of the finger or the pen.

Hereinafter, display driving components and display driving will be described with reference to FIGS. 1 and 2, and touch sensing components and touch driving will be described with reference to FIGS. 1 and 3.

Referring to FIGS. 1 and 2, in order to provide the display function, the touch display device according to exemplary embodiments may include: a display panel DISP in which a plurality of data lines DL and a plurality of gate lines GL are disposed and a plurality of subpixels SP defined by the plurality of data lines DL and the plurality of gate lines GL arrayed in the display panel DISP; a data driving circuit DDC electrically connected to the display panel DISP to drive the plurality of data lines DL; a gate driving circuit GDC electrically connected to the display panel DISP to drive the plurality of gate lines GL; and a display controller DCTR controlling the data driving circuit DDC and the gate driving circuit GDC.

The display controller DCTR controls the data driving circuit DDC and the gate driving circuit GDC by supplying a variety of control signals to the data driving circuit DDC and the gate driving circuit GDC.

The display controller DCTR starts scanning at the timing realized by respective frames, converts image data, input from an image supply device (or video data supply device) VDS, into output image data having a data signal format readable by the data driving circuit DDC, outputs the output image data, and controls data driving at appropriate points in time according to the scanning.

The gate driving circuit GDC sequentially supplies a gate signal having an on or off voltage to the plurality of gate lines GL, under the control of the display controller DCTR.

When a specific gate line GL is opened by the gate driving circuit GDC, the data driving circuit DDC converts the output image data, received from the display controller DCTR, into an analog image signal, and supplies a data signal Vdata, corresponding to the analog image signal, to the plurality of data lines DL.

The display controller DCTR may be a timing controller used in typical display technology, may be a control device including a timing controller and performing other control functions, or may be a control device different from the timing controller.

The display controller DCTR may be provided as a component separate from the data driving circuit DDC, or may be provided in combination with the data driving circuit DDC to form an integrated circuit (IC).

The data driving circuit DDC drives the plurality of data lines DL by supplying the data signal Vdata to the plurality of data lines DL. Herein, the data driving circuit DDC is also referred to as a "source driver."

The data driving circuit DDC may include one or more source driver ICs (SDICs). Each of the source driver ICs may include a shift register, a latch circuit, a digital-to-analog converter (DAC), an output buffer, etc. In some cases, the source driver IC may further include an analog-to-digital converter (ADC).

Each of the source driver ICs may be connected to a bonding pad of the display panel DISP by a tape-automated bonding (TAB) method or a chip-on-glass (COG) method, may be directly mounted on the display panel DISP, or in some cases, may be integrated with the display panel DISP. In addition, each of the source driver ICs may be implemented using a chip-on-film (COF) structure mounted on a film connected to the display panel DISP.

The gate driving circuit GDC sequentially drives the plurality of gate lines GL by sequentially supplying the scan signal Vgate (also referred to as a scan voltage, a gate signal, or a gate voltage) to the plurality of gate lines GL. Herein, the gate driving circuit GDC is also referred to as a "scan driver."

Here, the scan signal Vgate is comprised of an off-level gate voltage by which the corresponding gate line GL is closed and an on-level gate voltage by which the corresponding gate line GL is opened.

More specifically, the scan signal Vgate is comprised of an off-level gate voltage, by which a transistor connected to the corresponding gate line GL is turned off, and an on-level gate voltage, by which a transistor connected to the corresponding gate line GL is turned on.

In a case in which the transistor is an n-type transistor, the off-level gate voltage may be a low-level gate voltage VGL, and the on-level gate voltage may be a high-level gate voltage VGH. If a case in which the transistor is a p-type transistor, the off-level gate voltage may be a high-level gate voltage VGH, and the on-level gate voltage may be a low-level gate voltage VGL. Hereinafter, for the sake of brevity, the off-level gate voltage will be described as being the low-level gate voltage and the on-level gate voltage will be described as being the high-level gate voltage by way of example.

The gate driving circuit GDC may include one or more gate driver ICs (GDICs). Each of the gate driver ICs may include a shift register, a level shifter, etc.

Each gate driving circuit GDC may be connected to a bonding pad of the display panel DISP by a TAB method or a COG method, may be implemented using a gate-in-panel (GIP) structure directly mounted on the display panel DISP, or in some cases, may be integrated with the display panel DISP. In addition, each of the gate driving circuit may be implemented using a COF structure mounted on a film connected to the display panel DISP.

The data driving circuit DDC may be disposed on one side of the display panel DISP (e.g., in the upper portion or the lower portion of the display panel DISP), as illustrated in FIG. 1. In some cases, the data driving circuit DDC may be disposed on both sides of the display panel DISP (e.g., in the upper portion and the lower portion of the display panel DISP), depending on the driving system, the design of the display panel, etc.

The gate driving circuit GDC may be disposed on one side of the display panel DISP (e.g., in the right portion or the left portion of the display panel DISP), as illustrated in FIG. 1. In some cases, the gate driving circuit GDC may be disposed on both sides of the display panel DISP (e.g., in the right portion and the left portion of the display panel DISP), depending on the driving system, the design of the display panel, or the like.

The touch display device according to exemplary embodiments may be one of various types of display device, such as a liquid crystal display (LCD) device or an organic light-emitting display device. The display panel DISP according to exemplary embodiments may be one of various types of display panel, such as an LCD panel and an organic light-emitting display panel.

Each of the subpixels SP arrayed in the display panel DISP may include one or more circuit elements (e.g., a transistor or capacitor).

For example, in a case in which the display panel DISP is an LCD panel, a pixel electrode may be disposed in each of the subpixels SP, and a transistor may be electrically connected between the pixel electrode and the corresponding data line DL. The transistor may be turned on by the scan signal Vgate, supplied to a gate electrode through the gate line GL. When turned on, the transistor may output the data signal Vdata, supplied to a source electrode (or a drain electrode) through the data line DL, to the drain electrode (or the source electrode), so that the data signal Vdata is applied to the pixel electrode electrically connected to the drain electrode (or the source electrode). An electric field may be generated between the pixel electrode to which the data signal Vdata is applied and the common electrode COM to which a common voltage Vcom is applied, and capacitance may be generated between the pixel electrode and the common electrode COM.

The structure of each of the subpixels SP may be variously determined, depending on the panel type, the function provided by the panel, the design, etc.

Referring to FIGS. 1 and 3, the touch display device according to exemplary embodiments may include a touchscreen panel TSP, and a touch circuit TC performing a sensing operation by driving the touchscreen panel TSP in order to provide the touch sensing function. The touch circuit TC may include a touch driving circuit TDC driving the touchscreen panel TSP, a touch controller TCTR detecting a touch using a result obtained from the touch driving circuit TDC sensing the touchscreen panel TSP, etc.

In a touch performed by a user using a pointer, the pointer may approach or contact the touchscreen panel TSP. Touch sensors may be disposed on the touchscreen panel TSP. The term "pointer" used herein may mean a finger, a pen, etc.

The pen, a touch input means of a user, may be a passive pen without a signal transmitting and receiving function or an active pen having a signal transmitting and receiving function. The pen is also referred to as a stylus or a stylus pen.

The touch driving circuit TDC may supply a touch driving signal to the touchscreen panel TSP, and performs sensing on the touchscreen panel TSP. The touch controller TCTR may detect a touch according to the result of the sensing on the touchscreen panel TSP performed by the touch driving circuit TDC. Herein, the operation of detecting a touch may mean determining at least one of whether or not a touch has been performed or touch coordinates.

The touchscreen panel TSP may be an external panel disposed externally of the display panel DISP or an embedded panel disposed within the display panel DISP.

In a case in which the touchscreen panel TSP is an external panel, the touchscreen panel TSP and the display panel DISP may be combined using an adhesive or the like after being separately fabricated. The external touchscreen panel TSP is also referred to as an add-on touchscreen panel.

In a case in which the touchscreen panel TSP is an embedded panel, the touchscreen panel TSP may be simultaneously fabricated during the fabrication process of the display panel DISP. That is, touch sensors of the touchscreen panel TSP may be disposed within the display panel DISP. The embedded touchscreen panel TSP may be an in-cell touchscreen panel, an on-cell touchscreen panel, a hybrid touchscreen panel, etc.

Hereinafter, for the sake of brevity, the touchscreen panel TSP will be taken as an embedded touchscreen panel disposed within the display panel DISP.

In a case in which the touchscreen panel TSP is embedded in the display panel DISP, i.e., a plurality of touch electrodes TE are disposed in the display panel DISP, the plurality of touch electrodes TE may be provided in the display panel DISP separately from electrodes used in the display driving, or electrodes disposed in the display panel DISP for the display driving may be used as the plurality of touch electrodes TE.

For example, common electrodes disposed in the display panel DISP may be divided into a plurality of pieces to be used as the plurality of touch electrodes TE. That is, the plurality of touch electrodes TE disposed in the display panel DISP may serve as display-driving electrodes while still being touch sensing electrodes. Hereinafter, the plurality of touch electrodes TE disposed in the display panel DISP will be taken as common electrodes.

The touch controller TCTR may be implemented, for example, as a micro control unit (MCU), a processor, etc.

The display controller DCTR and the touch controller TCTR may be provided separately or in combination with each other.

Referring to FIG. 3, the plurality of touch electrodes TE are disposed in the touchscreen panel TSP of the touch display device according to exemplary embodiments, and a plurality of touch lies TL, electrically connecting the plurality of touch electrodes TE to the touch driving circuit TDC, may be disposed. One or more touch lines TL may be electrically connected to each of the touch electrodes TE through one or more contact holes.

The touch display device according to exemplary embodiments may detect a touch using self-capacitance of the touch electrodes or mutual capacitance between the touch electrodes TE.

In a case in which the touch display device according to exemplary embodiments detects a touch using self-capacitance, a plurality of first touch electrode lines and a plurality of second touch electrode lines may be disposed in the touchscreen panel TSP in an intersecting manner. For example, the plurality of first touch electrode lines may be disposed in the X-axis direction, while the plurality of second touch electrode lines may be disposed in the Y-axis direction. Here, each of the first touch electrode lines and the second touch electrode lines may be a single bar-shaped touch electrode or two or more touch electrode sections electrically connected to each other. The first touch electrode lines may be referred to as driving lines, driving electrodes, driving touch electrode lines, Tx lines, Tx electrodes, Tx touch electrode lines, etc., while the second touch electrode lines may be referred to as receiving lines, receiving electrodes, receiving touch electrode lines, sensing lines, sensing electrodes, sensing touch electrode lines, Rx lines, Rx electrodes, Rx touch electrode lines, etc.

In this case, the touch driving circuit TDC may supply a driving signal to one or more first touch electrode lines among the plurality of first touch electrode lines and output sensing data by sensing the second touch electrode lines, while the touch controller TCTR may determine at least one of a touch or touch coordinates using the sensing data.

In a case in which the touch display device according to exemplary embodiments detects a touch using mutual capacitance, the plurality of touch electrodes TE may be disposed in the touchscreen panel TSP, in a form in which the plurality of touch electrodes TE are divided from each other.

In this case, the touch driving circuit TDC may supply a driving signal (hereinafter, referred to as a touch electrode driving signal) TDS to one or more touch electrodes TE among the plurality of touch electrodes TE, output sensing data by sensing the one or more touch electrodes TE to which the driving signal has been supplied, and determine at least one of a touch or touch coordinates using the sensing data.

Hereinafter, for the sake of brevity, the touch display device according to exemplary embodiments will be described regarding a case in which touch sensing is based on self-capacitance, and in which the touchscreen panel TSP is configured as illustrated in FIGS. 2 and 3.

The touch electrode driving signal TDS, output from the touch driving circuit TDC, may be a constant voltage signal or a variable voltage signal.

In a case in which the touch electrode driving signal TDS is a variable voltage signal, the touch electrode driving signal TDS may be any of various signal waveforms, such as a sine wave, a triangular wave, and a square wave.

Hereinafter, in a case in which the touch electrode driving signal TDS is a variable voltage signal, the touch electrode driving signal TDS will be regarded as a pulse signal composed of a plurality of pulses. In a case in which the touch electrode driving signal TDS is a pulse signal composed of a plurality of pulses, the touch electrode driving signal TDS may have a constant frequency or a variable frequency.

Referring to FIGS. 2 and 3, the size of an area occupied by a single touch electrode TE may correspond to the size of an area occupied by a single subpixel SP or the size of an area occupied by two or more subpixels SP.

A plurality of touch electrodes TE are arrayed in a single touch electrode column. Here, a plurality of touch lines TL electrically connected to the plurality of touch electrodes TE may overlap the plurality of touch electrodes TE. For example, in a case in which a plurality of touch electrodes TE arrayed in a single touch electrode column include a first touch electrode and a second touch electrode, a first touch line connected to the first touch electrode may be electrically disconnected from the second touch electrode while overlapping the second touch electrode.

Figure 4:
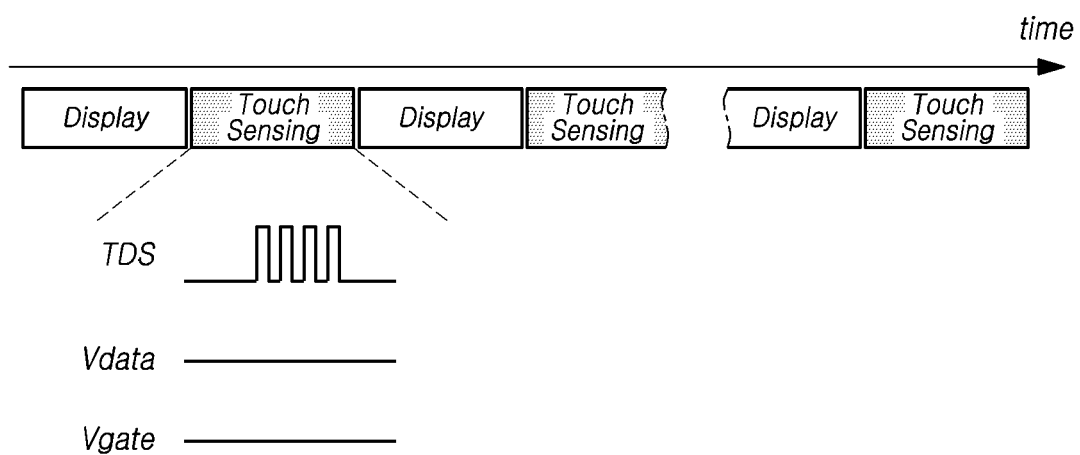
FIGS. 4 and 5 illustrate time division driving performed in the touch display device according to exemplary embodiments.
Figure 5:
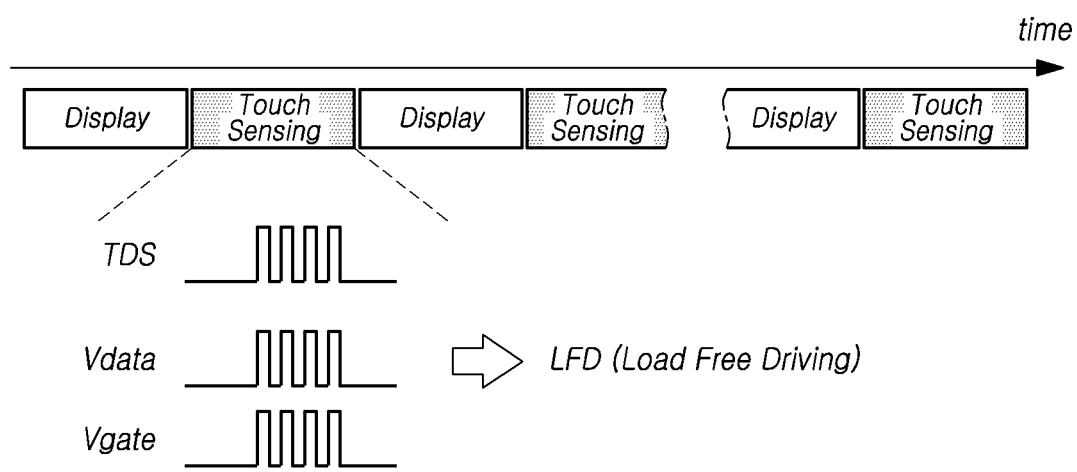

FIGS. 4 and 5 illustrate time division driving (TDD) performed in the touch display device according to exemplary embodiments.

Referring to FIG. 4, the touch display device according to exemplary embodiments may alternately perform display processing and touch sensing. Such a method of alternately performing display driving for the display processing and touch driving for the touch sensing is referred to as a time division driving (TDD) method.

According to the time division driving method, a display period for the display processing and a touch sensing period for the touch sensing alternate with each other. During the display period, the touch display device may perform the display driving. During the touch sensing period, the touch display device may perform the touch driving.

In an example of the time division driving method, a one-frame period may be divided into a single display period and a single touch sensing period. In another example of the time division driving method, the one-frame period may be divided into two or more display periods and one or more touch sensing periods.

Referring to FIG. 4, according to the time division driving method, during the touch sensing period, the touch electrode driving signal TDS may be applied to one or more touch electrodes TE among the plurality of touch electrodes TE. In this case, either the plurality of data lines DL or the plurality of gate lines GL may not be driven.

In this case, due to a potential difference, unnecessary parasitic capacitance may be generated between a touch electrode TE, to which the touch electrode driving signal TDS is applied, and one or more data lines DL located adjacent thereto. Such unnecessary parasitic capacitance may increase resistance-capacitance (RC) delay in the corresponding touch electrode TE and the touch line TL connected thereto, thereby lowering touch sensitivity.

In addition, unnecessary parasitic capacitance may be generated between a touch electrode TE, to which the touch electrode driving signal TDS is applied, and one or more gate lines GL located adjacent thereto, due to a potential difference. Such unnecessary parasitic capacitance may increase resistance-capacitance (RC) delay in the corresponding touch electrode TE and the gate line GL connected thereto, thereby lowering touch sensitivity.

In addition, unnecessary parasitic capacitance may be generated between a touch electrode TE, to which the touch electrode driving signal TDS is applied, and one or more other touch electrode TE located adjacent thereto, due to a potential difference. Such unnecessary parasitic capacitance may increase resistance-capacitance (RC) delay in the adjacent touch electrodes TE, thereby lowering touch sensitivity.

The RC delay described above may also be referred to as time constant or load.

In order to remove the load, the touch display device according to exemplary embodiments may perform load free driving (LFD) during the touch sensing period.

In the load free driving, when the touch electrode driving signal TDS is applied to the entirety or a portion of the plurality of touch electrodes TE, the touch display device according to exemplary embodiments may apply a load free driving (LFD) signal to the entirety of the plurality of data lines DL or a portion of the plurality of data lines DL, which may cause parasitic capacitance, as a data signal Vdata.

In the load free driving, when the touch electrode driving signal TDS is applied to the entirety or a portion of the plurality of touch electrodes TE, the touch display device according to exemplary embodiments may apply the LFD signal to the entirety of the plurality of gate lines GL or a portion of the plurality of gate lines GL, which may cause parasitic capacitance, as a gate signal Vgate.

In the load free driving, when the touch electrode driving signal TDS is applied to the entirety or a portion of the plurality of touch electrodes TE, the touch display device according to exemplary embodiments may apply the LFD signal to the entirety of the remaining touch electrodes TE or a portion of the remaining touch electrodes TE, which may cause parasitic capacitance.

The LFD signal may be a touch electrode driving signal or a signal, characteristic of which are the same as or similar to those of the touch electrode driving signal.

For example, the frequency and phase of the LFD signal may be the same as or within a predetermined error range from those of the touch electrode driving signal TDS. In addition, the amplitude of the LFD signal may be the same as or within a predetermined error range from that of the touch electrode driving signal TDS. In some cases, the amplitude of the LFD signal may have an intended difference from that of the touch electrode driving signal TDS.

Figure 6:
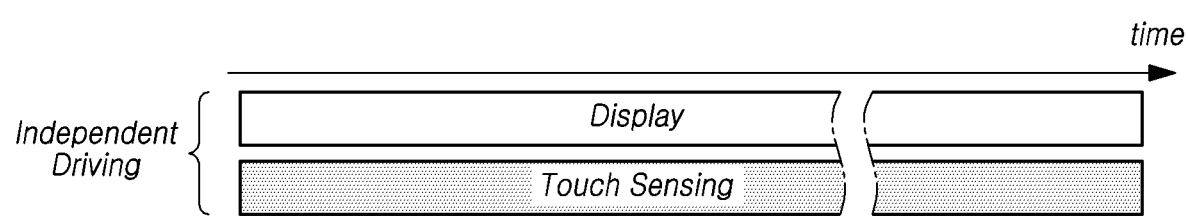
FIG. 6 illustrates time-free driving of the touch display device according to exemplary embodiments.

FIG. 6 illustrates time-free driving (TFD) of the touch display device according to exemplary embodiments.

Referring to FIG. 6, the touch display device according to exemplary embodiments can perform display processing and touch sensing independently of each other. Such a driving method of performing display driving for the display processing and touch driving for the touch sensing independently of each other is referred to as a time-free driving (TFD) method.

According to the time-free driving method, the display processing may be performed regardless of the time at which the touch sensing is performed. In the same manner, the touch sensing may be performed regardless of a period in which the display processing is performed.

According to the time-free driving method, the display driving for the display processing and the touch driving for the touch sensing may be simultaneously performed. In addition, in a specific period, the display driving for the display processing or the touch driving for the touch sensing may only be performed.

Figure 7:
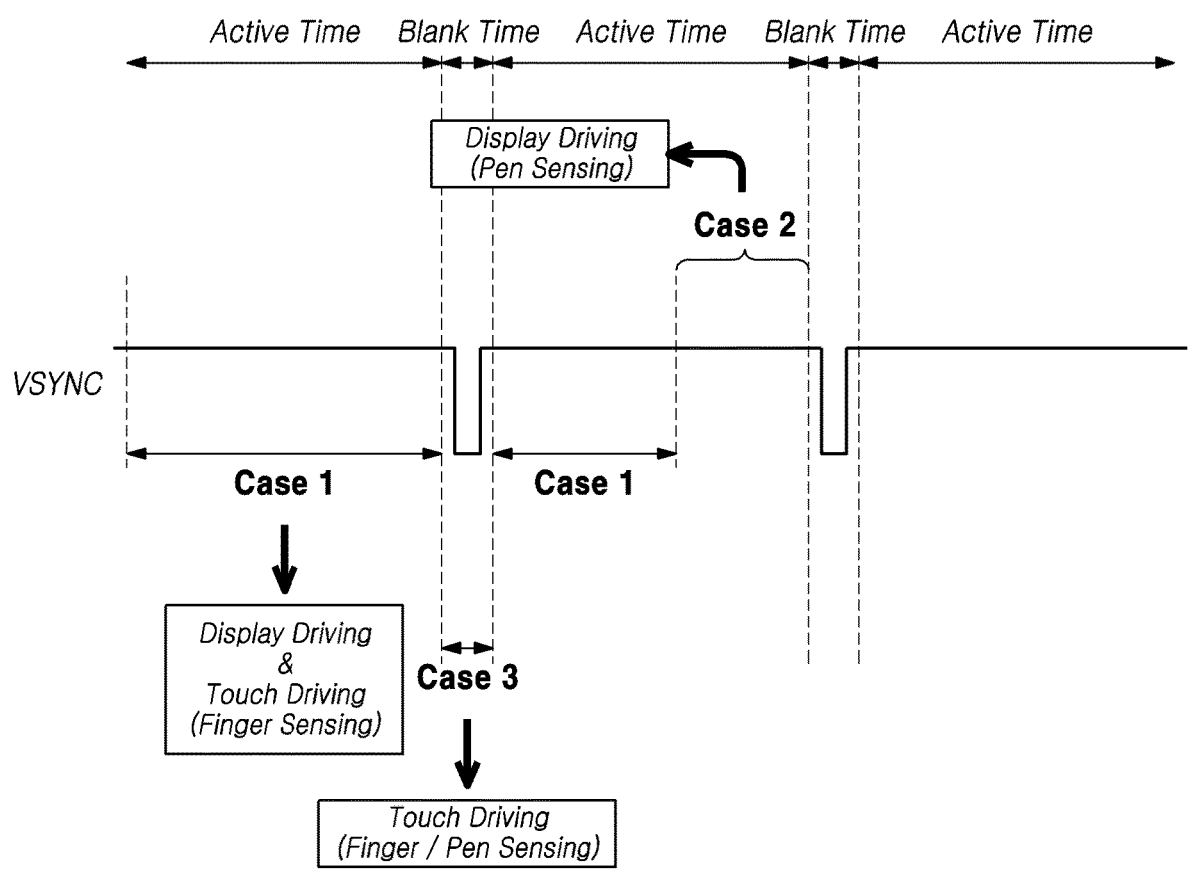
FIG. 7 illustrates three cases of time-free driving in a case in which the touch display device according to exemplary embodiments operates according to the time-free driving method.
Figure 8:
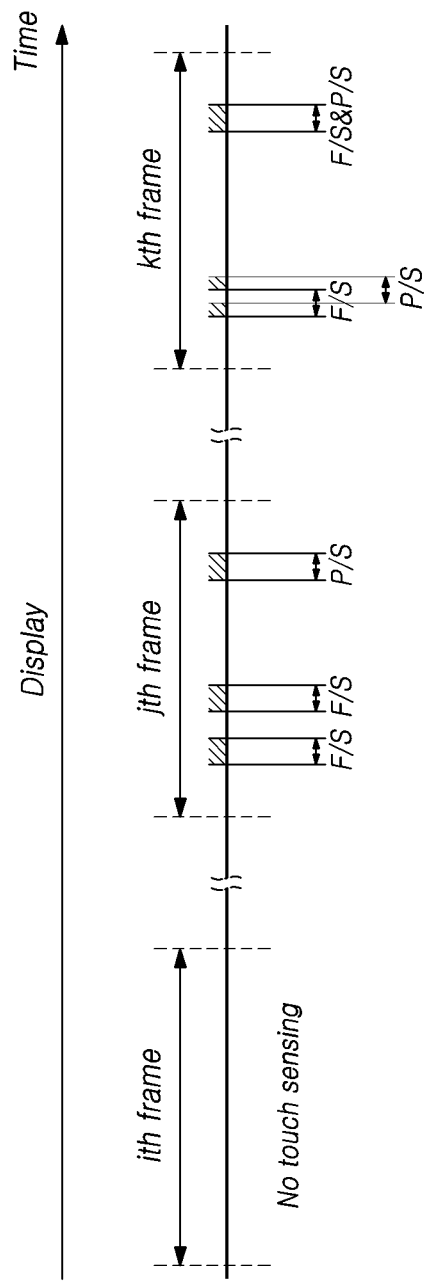
FIG. 8 illustrates various timings of finger sensing and pen sensing according to the time-free driving method in the touch display device according to exemplary embodiments.

FIG. 7 illustrates three cases of time-free driving Case 1, Case 2, and Case 3 in a case in which the touch display device according to exemplary embodiments operates according to the time-free driving method, FIG. 8 illustrates various timings of finger sensing F/S and pen sensing P/S according to the time-free driving method in the touch display device according to exemplary embodiments, and FIG. 9 illustrates touch electrode driving signals TDS according to the three cases of time-free driving Case 1, 2, and 3 in the touch display device according to exemplary embodiments.

According to the first case of time-free driving Case 1, the touch display device may simultaneously perform the display driving and the touch driving.

In Case 1, the touch display device may supply the touch electrode driving signal TDS having a variable voltage to the touch electrodes TE in order to perform the touch driving.

Hereinafter, in Case 1, the touch electrode driving signal TDS applied to the touch electrodes TE will be referred to as a first touch electrode driving signal TDS1 in the form of a modulated signal swinging with a predetermined amplitude. Hereinafter, the amplitude of the first touch electrode driving signal TDS1 will also be referred to as a first amplitude AMP1.

In Case 1, the touch display device may detect a finger touch, performed by touching the touchscreen panel TSP with a finger, by performing the touch driving. The detection of the finger is also referred to as finger sensing.

In addition, in Case 1, in a case in which a finger or a pen has approached the touchscreen panel TSP without contacting the touchscreen panel TSP, the touch display device may detect a finger touch or a pen by performing the touch driving. The detection of the finger touch or the pen in this manner is referred to as hover sensing.

According to the second case of time-free driving Case 2, the touch display device may perform the display driving.

In Case 2, the touch display device does not perform typical touch driving, since it is not required to detect a finger touch. That is, the touch display device does not supply the touch electrode driving signal TDS having a variable voltage to the plurality of touch electrodes TE disposed in the touchscreen panel TSP.

In Case 2, the touch display device may supply touch electrode driving signal TDS in the form of a direct current (DC) voltage. Hereinafter, in Case 2, the touch electrode driving signal TDS applied to the touch electrodes TE will also be referred to as a second touch electrode driving signal TDS2 or a common voltage Vcom.

In addition, in Case 2, i.e., in a case in which the second touch electrode driving signal TDS2, in the form of a DC voltage, is applied to the touch electrodes TE, the touch display device may detect the pen by receiving a pen signal (i.e., a down link signal) output from the pen. For example, the touch display device may obtain various pieces of information regarding the pen, such as position, tilt, pressure (writing pressure), or various additional pieces of information (e.g., button input information, pen ID, and battery information), depending on the result of the pen sensing.

According to the third case of time-free driving Case 3, the touch display device may perform the touch driving.

In Case 3, the touch display device may supply the touch electrode driving signal TDS in the form of a variable voltage, i.e., a modulated signal swinging with a predetermined amplitude, in order to perform the touch driving.

Hereinafter, in Case 3, the touch electrode driving signal TDS applied to the touch electrodes TE will be referred to as a third touch electrode driving signal TDS3. The amplitude of the third touch electrode driving signal TDS3 will also be referred to as a third amplitude AMP3.

The third amplitude AMP3 of the third touch electrode driving signal TDS3 in Case 3 may be different from the first amplitude AMP1 of the first touch electrode driving signal TDS1 in Case 1.

In Case 3, the touch display device may detect a finger touch performed by touching the touchscreen panel TSP with a finger by performing the touch driving.

In addition, during a period of time in which Case 3 is performed, the sensing driving for a pen may be performed, instead of the touch driving for a finger touch.

For example, as will be described later, during the period of time in which Case 3 is performed, the touch driving circuit TDC may supply a beacon signal, directed to one or more pens, to the entirety or a portion of the touch electrodes TE. The beacon signal may include various pieces of pen driving control information for the pen sensing.

Referring to FIG. 7, in the touch display device, the three cases of time-free driving Case 1, Case 2, and Case 3, Case 1 may be performed during an active period (or active time), while Case 3 may be performed during a blank period (or blank time). The active period may correspond to a period of time in which a screen of one frame is displayed, while the blank period may correspond to a period of time after the screen of a single frame has been displayed and before the screen of the next frame starts to be displayed.

Referring to FIG. 7, during the active period, Case 1 may be changed to Case 2.

Referring to FIG. 7, during the active period, the touch display device may perform both the display driving and the touch driving (Case 1).

In addition, during the active period, the touch display device may perform both the display driving and the touch driving (Case 1) and then stop the touch driving for the finger sensing in order to perform only the display driving or perform the pen sensing instead of the finger sensing (Case 1 changed to Case 2).

As described above, in Case 1 and Case 3, in the touch driving for the finger sensing, the touch electrode driving signal TDS1 having the amplitude AMP1 and the touch electrode driving signal TDS1 having the amplitude TDS3 may be applied to the touch electrodes TE. In contrast, in Case 2, the touch electrode driving signal TDS2 in the form of a DC voltage may be applied to the touch electrodes TE, so that only the display driving is performed or the pen sensing is performed together with the display driving.

In addition, referring to FIG. 9, the first amplitude AMP1 of the first touch electrode driving signal TDS1, applied to the touch electrodes TE in a case in which both the display driving and the touch driving are performed (Case 1), may be smaller than the third amplitude AMP3 of the third touch electrode driving signal TDS3 applied to the touch electrodes TE in a case in which only the touch driving is performed (Case 3).

The first amplitude AMP1 of the first touch electrode driving signal TDS1, applied to the touch electrodes TE during the active period, may be smaller than the third amplitude AMP3 of the third touch electrode driving signal TDS3 applied to the touch electrodes TE during the blank period.

Referring to FIGS. 7 and 9, during the active period, the touch driving circuit TDC may supply the first touch electrode driving signal TDS1, having the first amplitude AMP1, or the second touch electrode driving signal TDS2, corresponding to a DC voltage, to the plurality of touch electrodes TE.

Referring to FIGS. 7 and 9, during the blank period, the touch driving circuit TDC may supply the third touch electrode driving signal TDS3 having the third amplitude AMP3 to one or more touch electrodes TE among the plurality of touch electrodes TE.

Here, the driving corresponding to Case 1 may be performed during the entirety of a one-frame period or may be performed only in one or more time intervals within the one-frame period. The driving corresponding to Case 2 may be performed during the entirety of all frames or in one or more frames, or may be performed only in one or more time intervals within a one-frame period. In the driving corresponding to Case 3, finger sensing driving or pen sensing driving may be performed.

Referring to FIG. 8, in the touch display device according to exemplary embodiments, according to the time-free driving method, the finger sensing F/S and the pen sensing P/S may be performed at various timings.

For example, as in the ith frame, only the display driving may be performed during a one-frame period, without the finger sensing F/S or pen sensing P/S. This may correspond to Case 2 without the pen sensing P/S.

In addition, as in the jth frame, during a one-frame period, the finger sensing F/S may be performed during necessary time intervals in the one-frame period. This may correspond to Case 1. In addition, during a one-frame period, the pen sensing P/S may be performed during necessary time intervals in the one-frame period. This may correspond to Case 2 without the pen sensing P/S. In addition, during a one-frame period, the finger sensing F/S and the pen sensing P/S may only be performed in non-overlapping time intervals in the one-frame period.

In addition, as in the kth frame, the finger sensing F/S and the pen sensing P/S may only be performed during overlapping time intervals in a one-frame period. In this case, the result of the finger sensing F/S and the result of the pen sensing P/S may be distinguished by the touch controller TCTR, using a predetermined algorithm or sensing position-specific signal analysis.

In addition to the illustrative cases described above, the display processing and the touch sensing (i.e., at least one of finger sensing or pen sensing) may be performed independently of each other at various timings.

Figure 10:
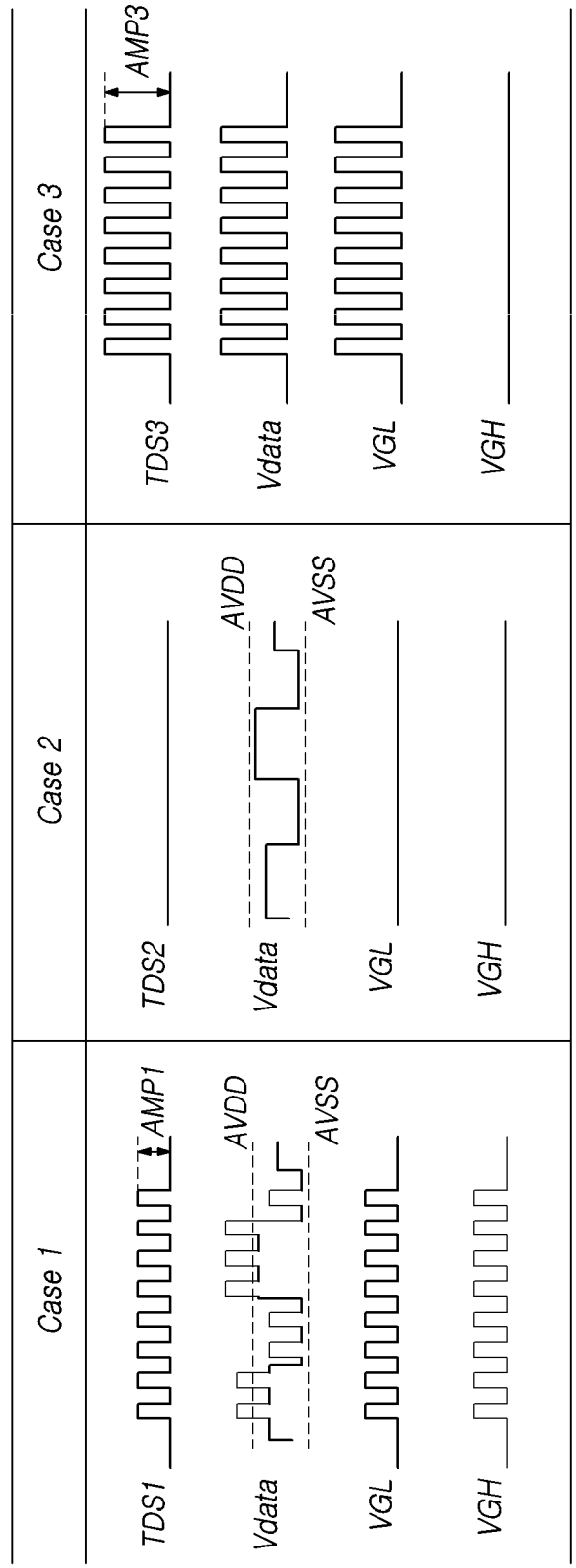
FIG. 10 illustrates signal waveforms of major signals according to the three cases of time-free driving in the touch display device according to exemplary embodiments.

FIG. 10 illustrates signal waveforms of major signals TDS, Vdata, VGL_M, and VGH_M according to the three cases of time-free driving Case 1, Case 2, and Case 3 in the touch display device according to exemplary embodiments.

Case 1 and Case 2 are driving cases during the active period. Case 3 is a driving case during the blank period.

An off-level gate voltage VGL and an on-level gate voltage VGH supplied to the gate driving circuit GDC to generate the touch electrode driving signal TDS applied to the touch electrodes TE, the data signal Vdata applied to the data lines DL, and the scan signal Vgate applied to the gate lines will be described with respect to the above-described three cases.

In Case 2 in which only the display driving is performed during the active period, the touch electrode driving signal TDS applied to the touch electrodes TE corresponds to the second touch electrode driving signal TDS2 in the form of a DC voltage. The touch electrode driving signal TDS may be referred to as the common voltage Vcom.

The data signal Vdata applied to the data lines DL is a signal corresponding to an image analog signal obtained by digital-analog converting an image digital signal for the display processing. The data signal Vdata may be a pixel voltage applied to a pixel electrode of a corresponding subpixel SP through the data line DL. Here, the data signal Vdata may be changed between a driving voltage AVDD and a base voltage AVSS.

Each of the off-level gate voltage VGL and the on-level gate voltage VGH of the scan signal applied to the gate lines GL is a corresponding DC voltage.

As described above, the touch electrodes TE may also serve as common electrodes for the display driving. Thus, in Case 2 in which only the display driving is performed during the active period, the second touch electrode driving signal TDS2 applied to the touch electrodes TE corresponds to a common voltage for the display processing.

Accordingly, in the corresponding subpixel SP, due to a voltage difference between the data signal Vdata, applied to the pixel electrode through the data line DL, and the second touch electrode driving signal TDS2 serving as a common voltage applied to the touch electrode TE, an electric field may be generated between the pixel electrode and the touch electrode TE, so that intended light can be emitted from the corresponding subpixel SP.

In Case 3 in which only the touch driving is performed during the blank period, the touch electrode driving signal TDS applied to the touch electrode TE is the third touch electrode driving signal TDS3 having the third amplitude AMP3.

During the blank period, the data lines DL may receive the data signal Vdata corresponding to a DC voltage applied thereto, or may be in a floated state. During the blank period, the gate lines GL may receive the scan signal Vgate, i.e., the off-level gate voltage VGL corresponding to a DC voltage, or may be in an electrically-floated state.

If the load free driving is performed during the blank period in which only the touch driving is performed, there may be voltage fluctuations in the data lines DL and the gate lines GL that are similar to those in the touch electrodes TE.

According to the load free driving, during the blank period, the data signal Vdata applied to the data lines DL may be a third touch electrode driving signal TD3 or the load free driving (LFD) signal having similar characteristics (e.g., phase, frequency, or amplitude) to those of the third touch electrode driving signal TD3.

In addition, according to the load free driving, during the blank period, the off-level gate voltage VGL applied to the gate lines GL may be the third touch electrode driving signal TD3 or the load free driving (LFD) signal having similar characteristics (e.g., phase, frequency, or amplitude) to those of the third touch electrode driving signal TD3.

In Case 1 in which both the display driving and the touch driving are performed during the active period, the touch electrode driving signal TDS applied to the touch electrodes TE is the first touch electrode driving signal TDS1 having the first amplitude AMP1.

In Case 1, the first touch electrode driving signal TDS1 is also the common voltage Vcom for the display driving while being the driving signal for the touch sensing.

The first touch electrode driving signal TDS1, applied to the touch electrodes TE, must have a voltage difference from the data signal Vdata corresponding to the pixel voltage for the display processing, the voltage difference being determined for the display processing.

In Case 1 in which the display driving and the touch driving are simultaneously performed, the first touch electrode driving signal TDS1 has two functions (i.e., serves as the driving signal for the touch sensing while serving as the common voltage for the display processing).

Since the common voltage Vcom corresponding to the first touch electrode driving signal TDS1 is a variable voltage instead of being a constant voltage as described above, the data signal Vdata applied to the data lines DL must have an additional voltage change by an amplitude equal to the first amplitude AMP1 of the first touch electrode driving signal TDS1, in addition to the original voltage change, so that each of the data lines DL is not influenced by the touch driving.

This ensures that only the original voltage change for the display processing is present in the voltage difference between the data signal Vdata corresponding to the pixel voltage and the first touch electrode driving signal TDS1 corresponding to the common voltage Vcom, from which a voltage change portion (i.e., the first amplitude AMP1) of the first touch electrode driving signal TDS1 is removed. Thus, the display processing can be performed ordinarily.

Accordingly, the data signal Vdata, of Case 1 in which the display driving and the touch driving are simultaneously performed, may be a combined signal of the data signal Vdata, of a case in which only the display driving is performed (Case 2), and the first touch electrode driving signal TDS1.

Explaining in a different manner, the data signal Vdata, in Case 1 in which the display driving and the touch driving are simultaneously performed, may be a signal obtained by offsetting the original data signal Vdata, of the case in which only the display driving is performed (Case 2), with the first touch electrode driving signal TDS1. Here, the data signal Vdata may experience a voltage change between the driving voltage AVDD and the base voltage AVSS.

Accordingly, the voltage difference between the data signal Vdata and the first touch electrode driving signal TDS1 in Case 1 in which the display driving and the touch driving are simultaneously performed is the same as the voltage difference between the data signal Vdata and the second touch electrode driving signal TDS2 in Case 2 in which only the display driving is performed.

In Case 1, the load free driving may be carried out, since the display driving and the touch driving are simultaneously performed.

That is, in Case 1, since the display driving and the touch driving are simultaneously performed, it may be necessary to prevent parasitic capacitance from being generated between the touch electrodes TE and the data lines DL due to the touch driving and prevent parasitic capacitance from being generated between the touch electrodes TE and the gate lines GL due to the touch driving.

According to the above description, in Case 1, only a voltage difference for the display processing is present between the touch electrodes TE and the data lines DL and unnecessary parasitic capacitance is not generated by the touch driving, since the voltages of the touch electrodes TE and the data lines DL fluctuate with changes in the voltage of the first touch electrode driving signal TDS1. That is, in Case 1, the load free driving of the data lines DL is essentially performed.

In Case 1, each of the off-level gate voltage VGL and the on-level gate voltage VGH supplied to the gate driving circuit GDC may be the LFD signal, the characteristics (e.g., phase, frequency, or amplitude) thereof being the same as or similar to the third touch electrode driving signal TD3, so that the gate driving circuit GDC can generate a scan signal SCAN to be applied to the gate lines GL.

Figure 11:
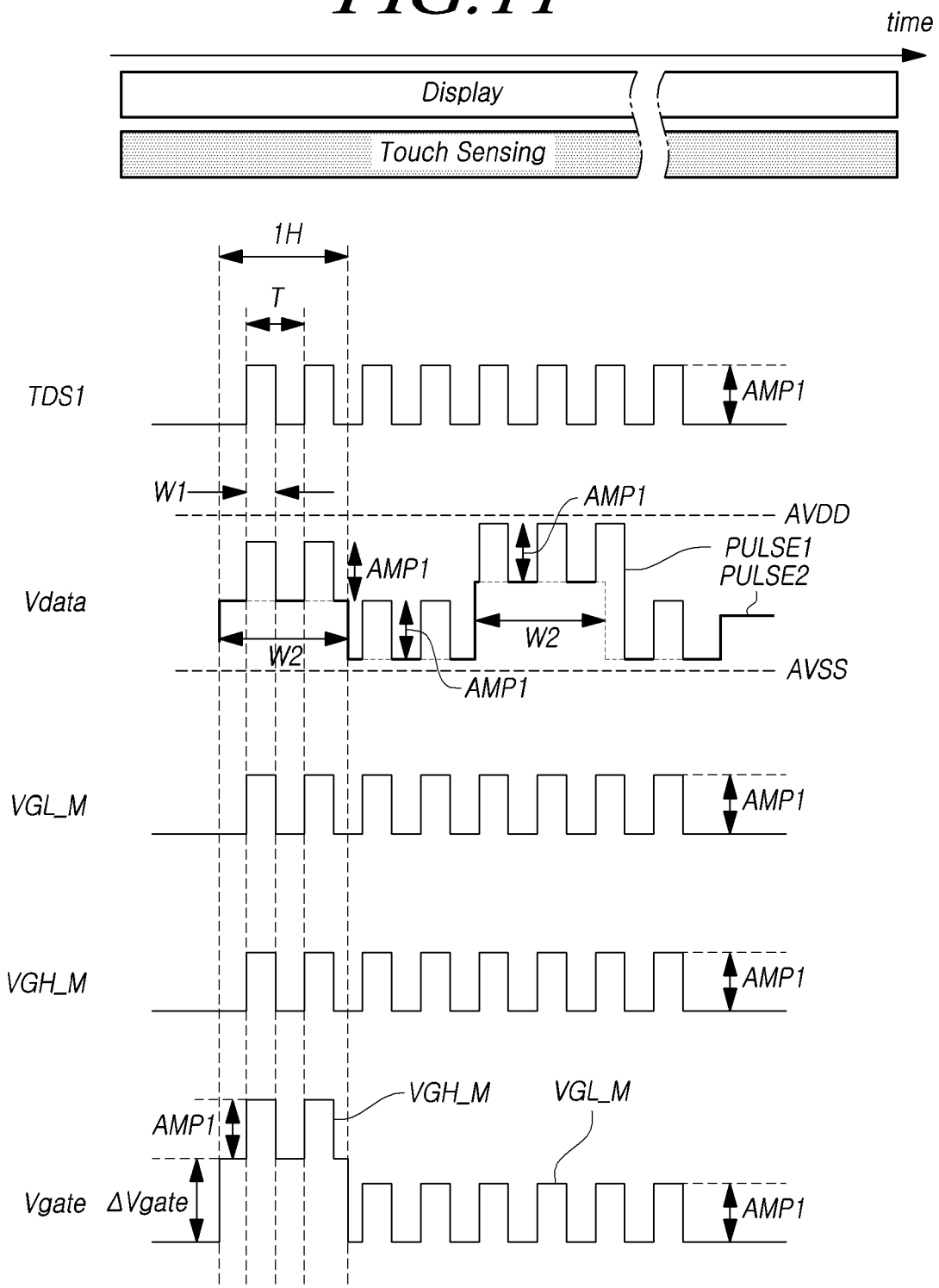
FIG. 11 illustrates signal waveforms of major signals for the time-free driving in a time-free driving system of the touch display device according to exemplary embodiments, in a case in which a first touch electrode driving signal has a high frequency.
Figure 12:
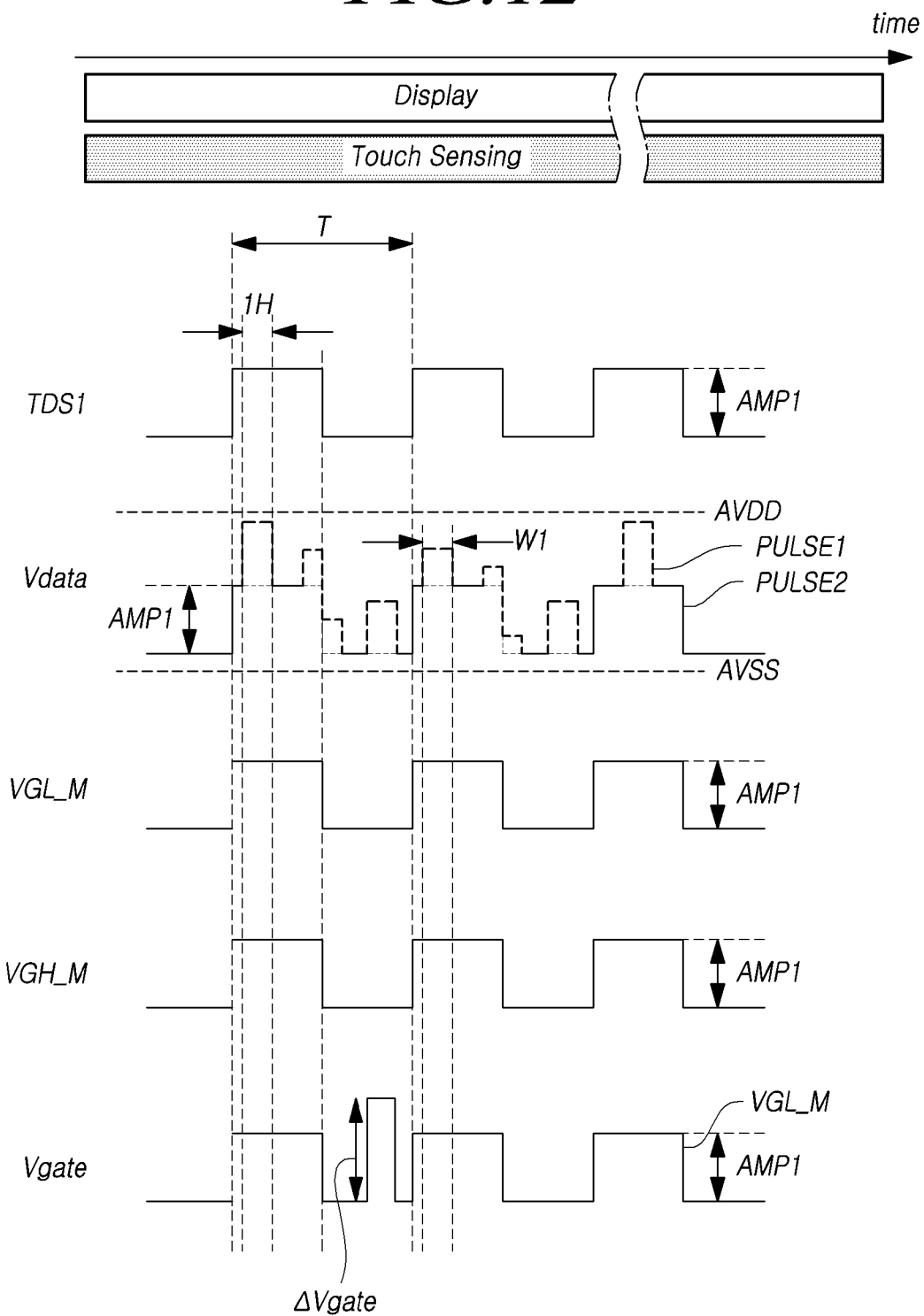
FIG. 12 illustrates signal waveforms of major signals for the time-free driving in the time-free driving system of the touch display device according to exemplary embodiments, in a case in which the first touch electrode driving signal has a low frequency.

FIG. 11 illustrates signal waveforms of major signals TDS1, Vdata, VGL_M, VGH_M, and Vgate for the time-free driving in a time-free driving (TFD) system of the touch display device according to exemplary embodiments, in a case in which the first touch electrode driving signal TDS1 has a high frequency, and FIG. 12 illustrates signal waveforms of major signals TDS1, Vdata, VGL_M, VGH_M, and Vgate for the time-free driving in the time-free driving system of the touch display device according to exemplary embodiments, in a case in which the first touch electrode driving signal TDS1 has a low frequency.

The frequency of the first touch electrode driving signal TDS1 may be set to be high or low. That is, the period T of the first touch electrode driving signal TDS1 may be short or long.

As illustrated in FIG. 11, the period T of the first touch electrode driving signal TDS1 may be shorter than a predetermined horizontal period. As illustrated in FIG. 12, the period T of the first touch electrode driving signal TDS1 may be longer than the predetermined horizontal period.

Here, the predetermined horizontal period may be 1H, 2H, 3H, etc. Hereinafter, the predetermined horizontal period will be described as being 1H by way of example.

Referring to FIGS. 11 and 12, in a case in which the display driving and the touch driving are simultaneously performed according to the time-free driving method, the data signal Vdata may be a combined signal comprised of first pulses PULSE1 having a first pulse width W1 and second pulses PULSE2 having a second pulse width W2. Here, the second pulse width W2 may be wider than the first pulse width W1.

Referring to FIGS. 11 and 12, the voltage of the data signal Vdata may change between the driving voltage AVDD and the base voltage AVSS.

As illustrated in FIG. 11, in a case in which the period T of the first touch electrode driving signal TDS1 is shorter than the predetermined horizontal period (e.g., 1H), the first pulses PULSE1 of the data signal Vdata may have a portion, the amplitude of which corresponds to the first amplitude AMP1 of the first touch electrode driving signal TDS1. The first pulse width W1 of the first pulses PULSE1 may correspond to the pulse width of the first touch electrode driving signal TDS1.

As illustrated in FIG. 12, in a case in which the period T of the first touch electrode driving signal TDS1 is longer than the predetermined horizontal period (e.g., 1H), the second pulses PULSE2 of the data signal Vdata may have a portion, the amplitude of which corresponds to the first amplitude AMP1 of the first touch electrode driving signal TDS1. The second pulse width W2 of the second pulses PULSE2 may correspond to the pulse width of the first touch electrode driving signal TDS1.

Referring to FIGS. 11 and 12, the frequency and phase of the off-level gate voltage VGL_M, supplied from a touch power circuit TPIC to the gate driving circuit GDC, correspond to the frequency and phase of the first touch electrode driving signal TDS1. The frequency and phase of the on-level gate voltage VGH_M, supplied from the touch power circuit TPIC to the gate driving circuit GDC, correspond to the frequency and phase of the first touch electrode driving signal TDS1.

Referring to FIGS. 11 and 12, the off-level gate voltage VGL_M and the on-level gate voltage VGH_M may have the same amplitude as the first amplitude AMP1 of the first touch electrode driving signal TDS1 or the same amplitude within an allowable range.

Referring to FIG. 11, the scan signal Vgate applied to a gate line GL may have the off-level gate voltage VGL_M during the remaining period other than the horizontal period 1H in which the corresponding gate line GL is opened and may have the on-level gate voltage VGH_M during the horizontal period 1H in which the corresponding gate line GL is opened. The scan signal Vgate may be a signal in which a voltage ΔVgate corresponding to an amplitude necessary for opening the corresponding gate line GL is added to the on-level gate voltage VGH_M. The voltage ΔVgate corresponding to the amplitude for opening the corresponding gate line GL may be a voltage difference between a high-level gate voltage VGH, in the form of a DC voltage, and a low-level gate voltage VGL.

Referring to FIG. 11, during the horizontal period 1H in which the corresponding gate line GL is opened, the scan signal Vgate applied to the gate line GL is a signal in which the off-level gate voltage VGL_M in the form of a modulated signal is carried on the on-level gate voltage VGH. During the remaining period other than the horizontal period 1H, the scan signal Vgate applied to the gate line GL is the off-level gate voltage VGL_M in the form of a modulated signal. Here, the frequency and phase of the off-level gate voltage VGL_M in the form of a modulated signal correspond to the frequency and phase of the first touch electrode driving signal TDS1.

Referring to FIG. 12, during the horizontal period 1H in which the corresponding gate line GL is opened, the scan signal Vgate applied to the gate line GL is a signal in which the voltage ΔVgate corresponding to an amplitude necessary for opening the corresponding gate line GL is carried on the off-level gate voltage VGL_M in the form of a modulated signal. During the remaining period other than the horizontal period 1H, the scan signal Vgate applied to the gate line GL is the off-level gate voltage VGL_M in the form of a modulated signal. Here, the frequency and phase of the off-level gate voltage VGL_M in the form of a modulated signal correspond to the frequency and phase of the first touch electrode driving signal TDS1.

Since the modulated ground voltage is applied to the display panel DISP, the voltage change of the data signal Vdata, illustrated in FIGS. 11 and 12, may be obtained. The modulated ground voltage may have a frequency and phase corresponding to those of the first touch electrode driving signal TDS1, and may have an amplitude corresponding to that of the first touch electrode driving signal TDS1.

The voltage change of the data signal Vdata, illustrated in FIGS. 11 and 12, may be obtained in a different manner by using a gamma reference voltage, used when the data driving circuit DDC converts an output image data to an analog data signal in the form of a modulated signal. The voltage changes of the data signal Vdata, illustrated in FIGS. 11 and 12, may be obtained. The gamma reference voltage in the form of a modulated signal may have a frequency and phase corresponding to those of the first touch electrode driving signal TDS1, and may have an amplitude corresponding to that of the first touch electrode driving signal TDS1.

Figure 13:
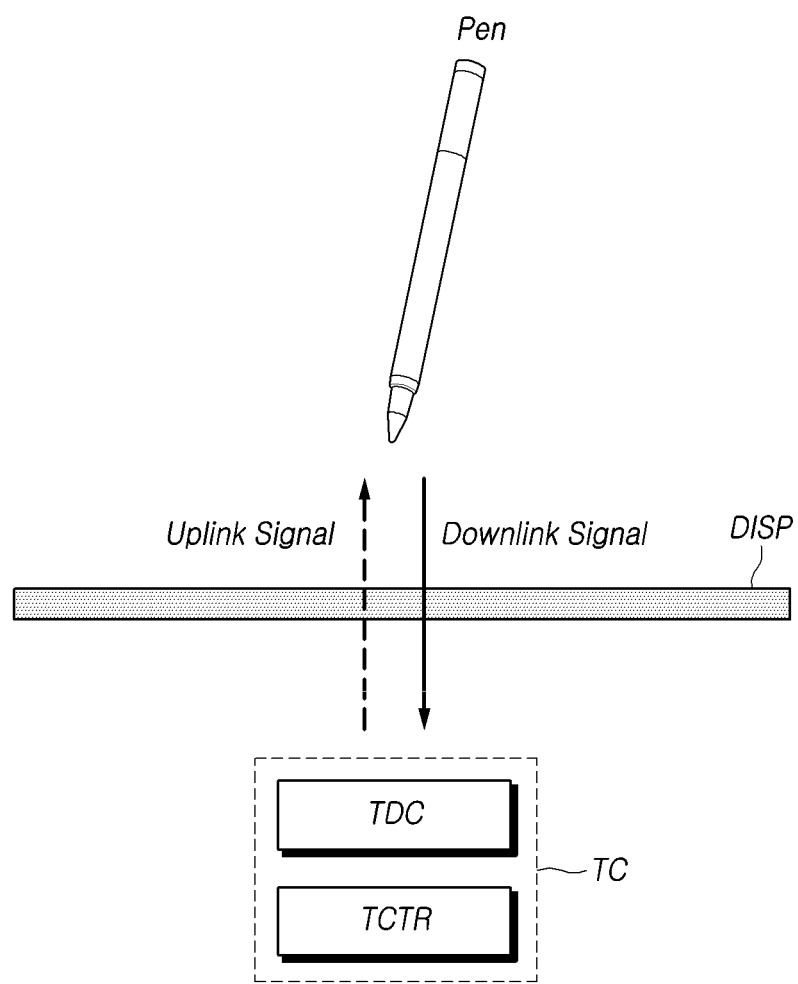
FIGS. 13 and 14 illustrate bidirectional communications between a pen and the touch driving circuit for the pen sensing in the touch display device according to exemplary embodiments.
Figure 14:
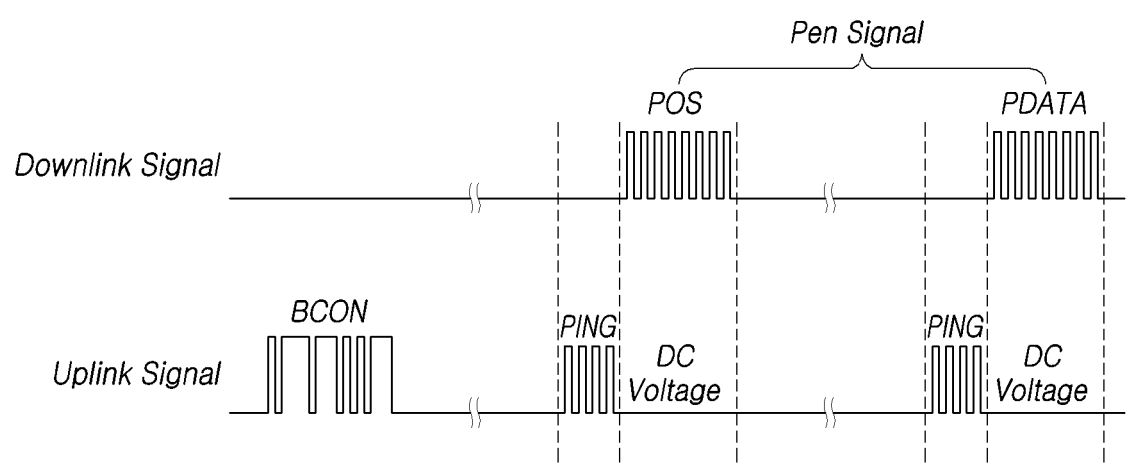

FIGS. 13 and 14 illustrate bidirectional communications between a pen and the touch driving circuit TDC for the pen sensing in a touch system according to exemplary embodiments.

Referring to FIG. 13, the touch system according to exemplary embodiments may include: a touch display device including the display panel DISP and the touch circuit TC; and one or more pen working in concert with the touch display device. Here, the touch circuit TC may include the touch driving circuit TDC and the touch controller TCTR.

The touch system according to exemplary embodiments may provide bidirectional communications between the touch circuit TC and the pen in order to detect the pen in contact with or adjacent to the display panel DISP.

The display panel DISP may serve as a transmission medium for bidirectional communications between the touch circuit TC and the pen. That is, the touch electrodes TE disposed in the display panel DISP may serve as a transmission medium for bidirectional communications between the touch circuit TC and the pen.

Bidirectional communications between the touch circuit TC and the pen may include uplink communications in which the touch circuit TC transmits a signal to the pen via the display panel DISP and downlink communications in which the pen transmits a signal to the touch circuit TC via the display panel DISP.

The signal that the touch circuit TC transmits to the pen via the display panel DISP is also referred to as an uplink signal. The signal that the pen transmits to the touch circuit TC via the display panel DISP is also referred to as a downlink signal.

In the touch driving for the pen sensing, the touch driving circuit TDC may supply the uplink signal to the entirety or a portion of the plurality of touch electrodes TE disposed in the display panel DISP.

Consequently, the pen, in contact with or adjacent to the display panel DISP, may receive the uplink signal, applied to one or more touch electrodes TE disposed in the display panel DISP, via a pen tip thereof.

The pen may output (or emit) the downlink signal (hereinafter, also referred to as a pen signal) in response to the uplink signal. The downlink signal allows the touch circuit TC to detect the position of the pen, the tilt (or inclination) of the pen, various additional pieces of information of the pen, etc.

The downlink signal output from the pen may be applied to one or more touch electrodes TE disposed in the display panel DISP.

The touch driving circuit TDC may receive the downlink signal applied to one or more touch electrodes TE, output from the pen. The touch controller TCTR may detect the presence of the pen, the position of the pen, the tilt of the pen, various additional pieces of information of the pen, etc., on the basis of the downlink signal received by the touch driving circuit TDC.

The touch driving circuit TDC may include a multiplexer circuit, a plurality of analog front ends, analog-to-digital converters (ADCs), etc. Each of the plurality of analog front ends may include a pre-amplifier electrically connected to the touch electrodes TE, an integrator integrating an output value of the pre-amplifier and outputting an integrated value, etc.

In some cases, the touch driving circuit TDC may include a touch power circuit in charge of supplying and generating various voltages and signals.

Referring to FIG. 14, for example, the uplink signal may include a beacon signal BCON. The beacon signal BCON may be a signal allowing the touch display device to control the driving of the pen for the pen sensing or notifying the pen of various pieces of information necessary for the pen sensing. The information included in the beacon signal BCON is information for the pen sensing. Hereinafter, for the sake of brevity, the information included in the beacon signal BCON will also be referred to as pen driving control information.

For example, the pen driving control information included in the beacon signal BCON may include at least one set of information from among panel information (e.g., panel state information, panel identification information, or panel type information regarding an incell type and the like), panel driving mode information (e.g., mode identification information regarding a pen search mode, a pen mode, etc.), information regarding characteristics of the downlink signal (e.g., a frequency and the number of pulses), driving timing-related information for the pen sensing, multiplexer driving information, power mode information (e.g., driving timing information regarding points in time at which neither the panel nor the pen is driven to reduce power consumption), etc. The pen driving control information may further include information for driving synchronization between the display panel DISP and the pen.

For example, since the beacon signal BCON is a signal having an information transfer function, the beacon signal BCON may be a pulse-width modulated signal in which the pen driving control information is expressed using a plurality of pulses. In this case, the plurality of pulses, included in the beacon signal BCON, may not have uniform pulse widths.

In addition, referring to FIG. 14, the uplink signal may further include a ping signal PING. The ping signal PING may be a control signal for synchronization of the downlink signal.

For example, the pen may output the downlink signal at a point in time at which the last pulse of the ping signal PING is detected or after a predetermined period of time has elapsed from the point in time.

The ping signal PING may be a single pulse or may include two or more pulses. In a case in which the ping signal PING includes two or more pulses, the ping signal PING may be a pulse-modulated signal of pulses having constant pulse widths, since the ping signal PING is a signal having a synchronization function without an information transfer function. That is, the ping signal PING may be a signal regularly swinging between a high level and a low level.

The synchronization function of the ping signal PING may be provided by the beacon signal BCON.

Referring to FIG. 14, after uplink signal BCON or PING is received, the pen may output the pen signal corresponding to the downlink signal, in response to the uplink signal.

The pen signal corresponding to the downlink signal may include a pen position detection signal POS allowing the touch circuit TC to detect at least one of the position of the pen or the tilt (inclination) of the pen, a pen data signal PDATA allowing the touch circuit TC to detect the pressure (or writing pressure) of the pen or various additional pieces of information of the pen, etc.

Here, the additional information of the pen may include at least one piece of information among, for example, a writing pressure, a pen identifier (ID), battery information, and information regarding checking and correction of information errors.

During a period in which the pen outputs the pen signal, such as the pen position detection signal POS or the pen data signal PDATA, the touch driving circuit TDC may supply a DC voltage as the touch electrode driving signal TDS to the touch electrodes TE (related to Case 2).

Figure 15:
FIG. 15 illustrates a driving timing diagram of the pen sensing performed in the time-free driving method in the touch display device according to exemplary embodiments.

FIG. 15 illustrates a driving timing diagram of the pen sensing performed in the time-free driving (TFD) method in the touch display device according to exemplary embodiments.

Referring to FIG. 15, a one-frame period may include a blank period and an active period, and may be defined by a vertical synchronization signal VSYNC.

During the one-frame period, a plurality of driving periods P1 to P16 for the touch driving may be defined and allocated by a touch synchronization signal TSYNCN.

The touch circuit TC transmits an uplink signal at a point in time determined according to the touch synchronization signal TSYNCN. When the uplink signal is received, the pen generates a downlink signal in response to the uplink signal.

According to the illustration of FIG. 15, the one-frame period may be divided into sixteen (16) driving periods P1 to P16. The 16 driving periods P1 to P16 may be allocated as, for example, a single uplink communications period P1, eleven (11) downlink communications periods P2, P3, P5-P7, P9 to P11, and P13 to P15, and four (4) finger sensing periods P4, P8, P12, and P16.

According to the illustration of FIG. 15, the single uplink communications period P1 included in the one-frame period may be a beacon transmission period P1 in which the beacon signal BCON is transmitted.

A beacon cycle in which the beacon signal BCON is transmitted may correspond to the one-frame period, be shorter than the one-frame period, or be longer than the one-frame period.

That is, the touch circuit TC may output the beacon signal BCON one time in every one-frame period, or may output the beacon signal BCON two or more times in different periods within the one-frame period. In some cases, the touch circuit TC may only output the beacon signal BCON in a one-frame period in every two or more frame periods.

Here, although the beacon signal BCON is applied to the touch electrodes TE in the blank period, the beacon signal BCON may be the touch electrode driving signal TDS different from the third touch electrode driving signal TDS3 illustrated in FIG. 9.

During the 11 downlink communications periods P2, P3, P5-P7, P9 to P11, and P13 to P15, included in the one-frame period, the pen sensing P/S may be performed.

During the 11 downlink communications periods P2, P3, P5-P7, P9 to P11, and P13 to P15, the touch circuit TC may supply a DC voltage to the plurality of touch electrodes TE of the display panel DISP.

During the 11 downlink communications periods P2, P3, P5-P7, P9 to P11, and P13 to P15, in a state in which a DC voltage is applied to the plurality of touch electrodes TE of the display panel DISP, the pen signal POS or PDATA, i.e., the downlink signal output from the pen, may be applied to one or more touch electrodes TE, and the touch circuit TC may perform the pen sensing by detecting the pen signal POS or PDATA applied to the one or more touch electrodes TE.

Since the 11 downlink communications periods P2, P3, P5-P7, P9 to P11, and P13 to P15 belong to the active period, the display driving is performed, and the finger sensing is not performed. Thus, the 11 downlink communications periods P2, P3, P5-P7, P9 to P11, and P13 to P15 are periods in which driving corresponding to Case 2 of FIG. 10 is performed.

Accordingly, the DC voltage applied to the touch electrodes TE during the 11 downlink communications periods P2, P3, P5-P7, P9 to P11, and P13 to P15 may correspond to the second touch electrode driving signal TDS2 of Case 2 illustrated in FIG. 9, or may be the common voltage Vcom in the form of a DC voltage.

In addition, the data signals Vdata supplied to the plurality of data lines DL during the 11 downlink communications periods P2, P3, P5-P7, P9 to P11, and P13 to P 15 may correspond to the data signals of Case 2 in FIG. 10.

In addition, as illustrated in FIG. 14, before the pen signal POS or PDATA, i.e., a downlink signal, is output from the pen, the touch circuit TC may supply the ping signal PING, i.e., an uplink signal, to one or more touch electrodes TE, among the plurality of touch electrodes TE, disposed in the display panel DISP, for signal synchronization.

For example, although not shown in FIG. 15, in every eleven downlink communications periods P2, P3, P5-P7, P9 to P11, and P13 to P15, before the touch circuit TC supplies the DC voltage, the ping signal PING may be applied to one or more touch electrodes TE among the plurality of touch electrodes TE disposed in the display panel DISP, and the pen may output the pen signal POS or PDATA after having received the ping signal PING.

Here, the ping signal PING may be a different type of touch electrode driving signal TDS, not illustrated in FIG. 9. The ping signal PING may be the touch electrode driving signal TDS applied to the touch electrodes TE during the driving period of Case 2, before the second touch electrode driving signal TDS2 corresponding to a DC voltage is applied to the touch electrodes TE.

During the four (4) finger sensing periods P4, P8, P12, and P16 in the one-frame period, the finger sensing F/S may be performed.

According to the time-free driving method, the 4 finger sensing periods P4, P8, P12, and P16 are in the active period, in which the display driving is performed, and the finger sensing is performed.

Thus, during the 4 finger sensing periods P4, P8, P12, and P16, the touch circuit TC may supply the first touch electrode driving signal TDS1 to the plurality of touch electrodes TE disposed in the display panel DISP.

In addition, since the first touch electrode driving signal TDS1 swinging with a predetermined amplitude AMP1 is applied to the plurality of touch electrodes TE disposed in the display panel DISP during the 4 finger sensing periods P4, P8, P12, and P16, the data signals Vdata supplied to the plurality of data lines DL may correspond to the data signals Vdata of Case 1 illustrated in FIGS. 10 to 12.

In addition, the first touch electrode driving signal TDS1 applied to the plurality of touch electrodes TE disposed in the display panel DISP during the 4 finger sensing periods P4, P8, P12, and P16 may correspond to the common voltage Vcom in the form of a modulated signal.

In the illustration of FIG. 15, the one-frame period is divided into the 16 driving periods P1 to P16; however, this is merely illustrative, and the one-frame period may be divided into a smaller or greater number of driving periods. In addition, the uplink communications period, the downlink communications period, and the number and/or position of the finger sensing periods in the one-frame period may be changed. Such period information may be previously defined as a protocol between the pen and the touch display device. In some cases, the period information may be transferred from the touch display device to the pen, carried on the beacon signal BCON or other signals. Alternatively, the period information may be transferred from the pen to the touch display device, carried on the pen signal.

Figure 16:
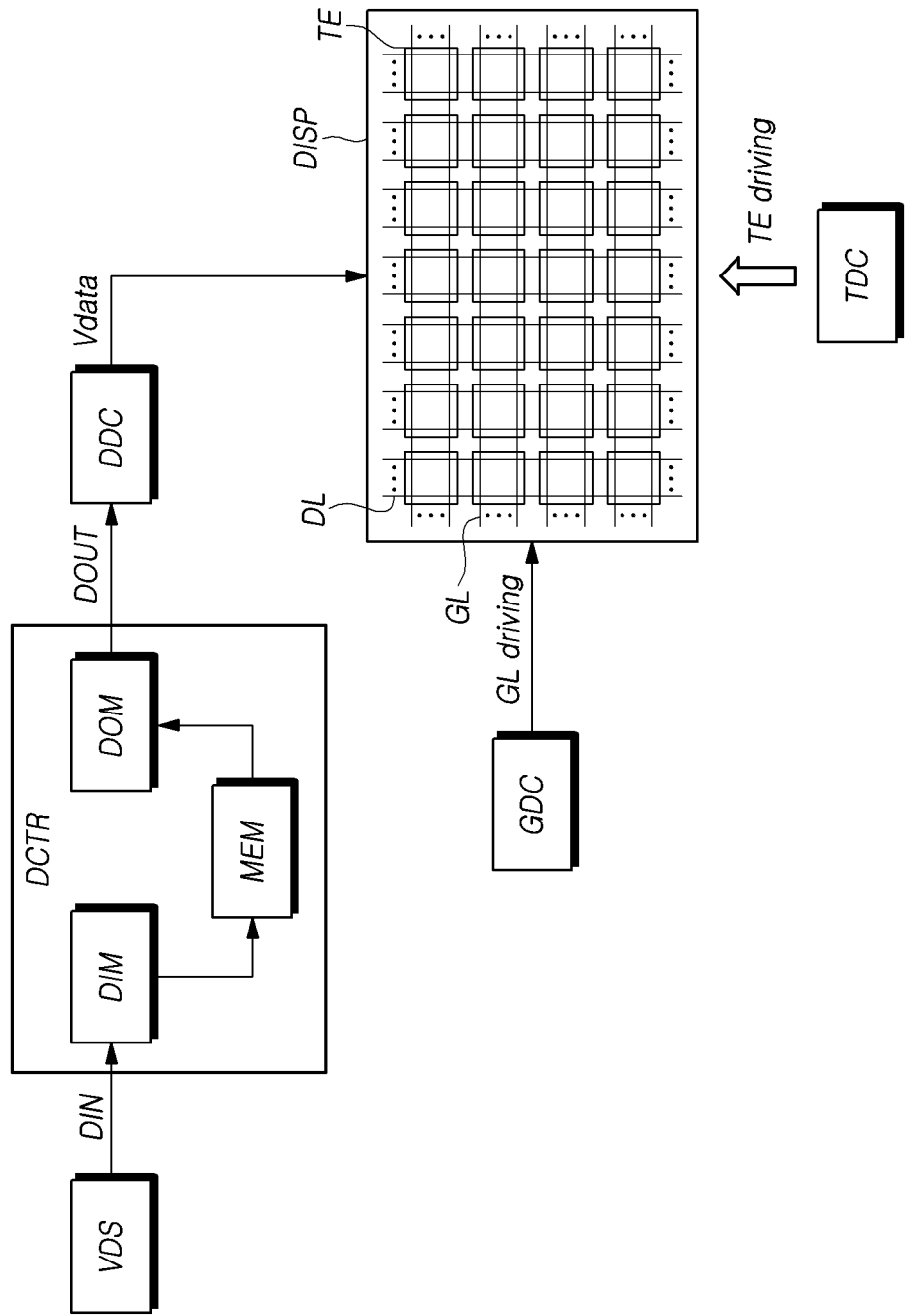
FIG. 16 illustrates an image signal transmission configuration of the touch display device according to exemplary embodiments.
Figure 17:
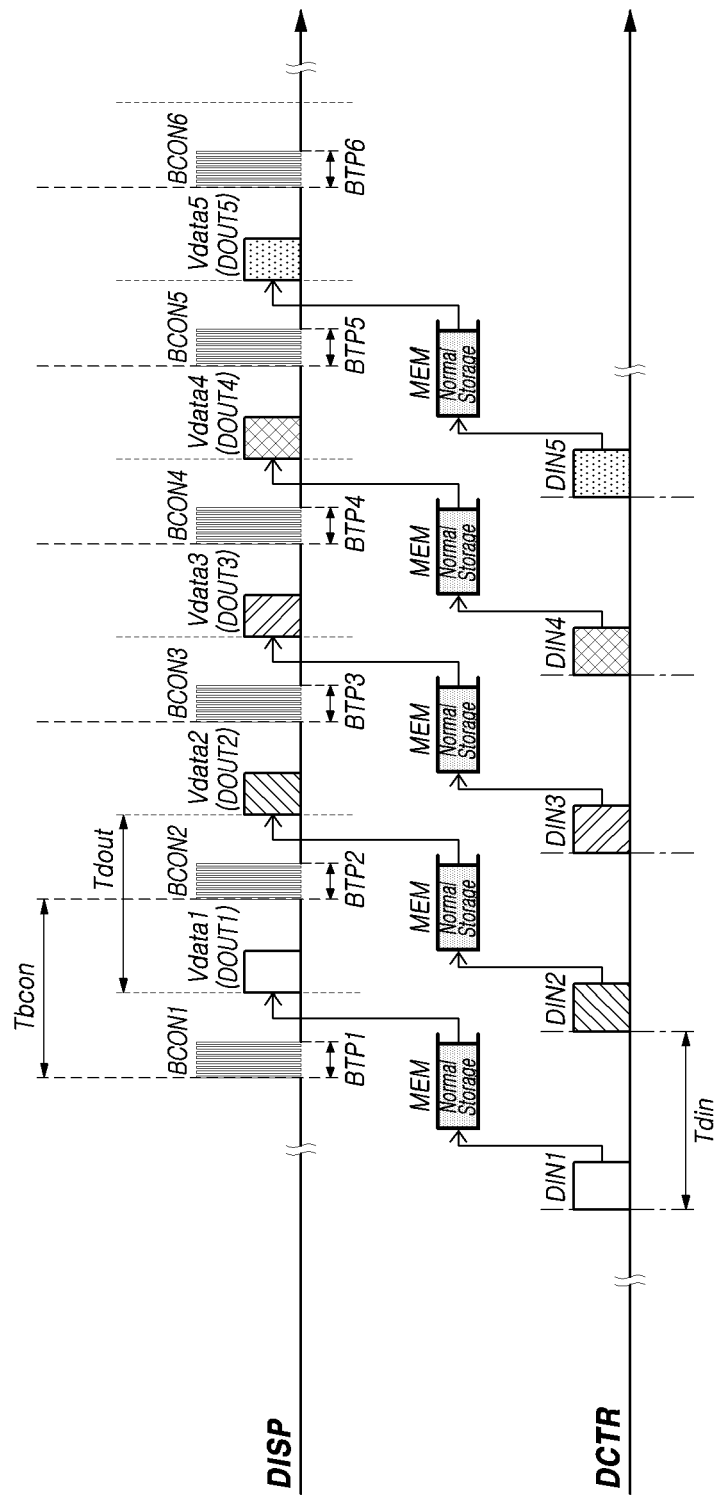
FIG. 17 is a signal diagram illustrating a normal data output situation in which data signals are ordinarily output to the display panel DISP between two beacon transmission periods in the touch display device according to exemplary embodiments.

FIG. 16 illustrates an image signal transmission configuration of the touch display device according to exemplary embodiments, and FIG. 17 is a signal diagram illustrating a normal data output situation in which data signals are ordinarily output to the display panel DISP between two beacon transmission periods in the touch display device according to exemplary embodiments.

Referring to FIG. 16, the touch display device according to exemplary embodiments may include: the display panel DISP in which the plurality of data lines DL and the plurality of gate lines GL are disposed, and the plurality of touch electrodes TE are disposed; the gate driving circuit GDC electrically connected to the display panel DISP, and sequentially outputting gate signals Vgate to the plurality of gate lines GL to drive the plurality of gate lines GL; the data driving circuit DDC electrically connected to the display panel DISP, and receiving output image data DOUT in the form of a digital signal, converting the output image data DOUT into analog data signals Vdata, and outputting the analog data signals Vdata to the plurality of data lines DL to drive the plurality of data lines DL; and the touch driving circuit TDC electrically connected to the display panel DISP, and driving the plurality of touch electrodes TE according to driving situations.

The display controller DCTR may store image data input from an image supply device (or video data supply device) VDS, and output the output image data DOUT to the data driving circuit DDC corresponding to the input image data DIN at predetermined timing.

Referring to FIG. 16, the display controller DCTR according to exemplary embodiments may include: a data input section DIM receiving the input image data DIN from the image supply device VDS; a memory MEM storing the input image data DIN; and a data output section DOM outputting the output image data DOUT corresponding to the input image data DIN.

The data input section DIM may receive the input image data DIN according to a predetermined input cycle Tdin.

The data output section DOM may output the output image data DOUT according to a predetermined output cycle Tdout.

The input cycle Tdin may correspond to a driving frequency of the data driving circuit DDC, i.e., 1/(output cycle).

Here, the input cycle Tdin and the output cycle Tdout may be the same or different.

For example, the output cycle Tdout may be shorter than the input cycle Tdin. That is, the driving frequency of the data driving circuit DDC may be higher than the driving frequency of the image supply device VDS.

The input image data DIN may be frame data Frame Data, i.e., data regarding each frame. In this case, the memory MEM may be referred to as a frame memory.

The output image data DOUT may be the same as the input image data DIN, or in some cases, may be image data obtained by converting input image data DIN into a data signal format readable by the data driving circuit DDC.

In addition, the beacon signal BCON may be supplied to the entirety or a portion of the plurality of touch electrodes TE, disposed in the display panel DISP, in every beacon cycle Tbcon. When the beacon signal BCON is supplied to the entirety or a portion of the plurality of touch electrodes TE disposed in the display panel DISP, the display panel DISP does not perform the display driving.

According to the above description, the touch driving circuit TDC outputs a first beacon signal BCON1 to the display panel DISP, and after the beacon cycle Tbcon, outputs a second beacon signal BCON2 to the display panel DISP.

Before the touch driving circuit TDC outputs the second beacon signal BCON2 after having output the first beacon signal BCON1, the display controller DCTR may output corresponding output image data DOUT1 to the data driving circuit DDC, and the data driving circuit DDC may output data signals Vdata1, corresponding to the output image data DOUT1 to, the plurality of data lines DL.

According to the above description, the beacon cycle Tbcon, in which the beacon signal BCON is output to the display panel DISP, may be set to correspond to the output cycle Tdout, in which the display controller DCTR outputs the output image data DOUT.

Here, the output cycle Tdout, in which the display controller DCTR outputs the output image data DOUT, may correspond to an output cycle, in which the data driving circuit DDC outputs the data signals Vdata.

Referring to FIG. 17, in a case in which the beacon cycle Tbcon and the input cycle Tdin correspond to each other, the corresponding data signals Vdata may be ordinarily output to the plurality of data lines DL of the display panel DISP during a period between two beacon transmission periods.

The first to sixth beacon signals BCON1 to BCON6 may output to the display panel DISP according to the beacon cycle Tbcon. The first to sixth beacon signals BCON1 to BCON6 may be output in first to sixth beacon transmission periods BTP1 to BTP6, respectively.

Each of the first to sixth beacon transmission periods BTP1 to BTP6 may be a blank period between active periods.

In a case in which the beacon cycle Tbcon corresponds to the input cycle Tdin, i.e., a frequency at which the display controller DCTR receives the input image data (i.e., a driving frequency of the image supply device VDS=1/(input cycle)) corresponds to a driving frequency of the data driving circuit DDC (=1(output cycle)), after the beacon signal BCON is output to the display panel DISP, the input image data DIN, regarding a corresponding frame to be supplied to the display panel DISP, is ordinarily stored in the memory MEM. Thus, after the beacon signal BCON is output to the display panel DISP, the data signals Vdata, i.e., analog signals converted from the output image data DOUT corresponding to the input image data DIN regarding the corresponding frame, may be output to the display panel DISP.

That is, in a case in which the beacon cycle Tbcon corresponds to the input cycle Tdin, due to the driving frequency of the image supply device VDS corresponding to the driving frequency of the data driving circuit DDC, the data signals Vdata of the corresponding frame may be ordinarily output to the display panel DISP after the beacon signal BCON is output to the display panel DISP and before the next beacon signal BCON is output to the display panel DISP.

Hereinafter, this will be described again with reference to FIG. 17.

After the first beacon signal BCON1 is output to the display panel DISP in a first beacon transmission period BTP1, the memory MEM of the display controller DCTR retains first input image data DIN1 regarding a first frame in an ordinarily stored state.

Accordingly, during the period between the first beacon transmission period BTP1 and the second beacon transmission period BTP2, first data signals Vdata1, analog signals converted from first output image data DOUT1 corresponding to the first input image data DIN1 ordinarily stored in the memory MEM, may be ordinarily output to the plurality of data lines DL.

After the second beacon signal BCON2 is output to the display panel DISP in the second beacon transmission period BTP2, the memory MED of the display controller DCTR retains second input image data DIN2 regarding a second frame, ordinarily stored therein.

Accordingly, during a period between the second beacon transmission period BTP2 and the third beacon transmission period BTP3, second data signals Vdata2, i.e., analog signals converted from second output image data DOUT2 corresponding to the second input image data DIN2 ordinarily stored in the memory MEM, may be ordinarily output to the plurality of data lines DL.

After the third beacon signal BCON3 is output to the display panel DISP in the third beacon transmission period BTP3, the memory MED of the display controller DCTR retains third input image data DIN3 regarding a third frame, ordinarily stored therein.

Accordingly, in a period between the third beacon transmission period BTP3 and the fourth beacon transmission period BTP4, a third data signal Vdata3, i.e., an analog signal converted from third output image data DOUT3 corresponding to the third input image data DIN3 ordinarily stored in the memory MEM, may be ordinarily output to the plurality of data lines DL.

After the fourth beacon signal BCON4 is output to the display panel DISP in the fourth beacon transmission period BTP4, the memory MED of the display controller DCTR retains fourth input image data DIN4 regarding a fourth frame, ordinarily stored therein.

Accordingly, in a period between the fourth beacon transmission period BTP4 and the fifth beacon transmission period BTP5, a fourth data signal Vdata4, i.e., an analog signal converted from fourth output image data DOUT4 corresponding to the fourth input image data DIN4 ordinarily stored in the memory MEM, may be ordinarily output to the plurality of data lines DL.

After the fifth beacon signal BCON5 is output to the display panel DISP in the fifth beacon transmission period BTP5, the memory MED of the display controller DCTR retains fifth input image data DIN5 regarding a fifth frame, ordinarily stored therein.

Accordingly, in a period between the fifth beacon transmission period BTP5 and the sixth beacon transmission period BTP6, a fifth data signal Vdata5, i.e., an analog signal converted from fifth output image data DOUT5 corresponding to the fifth input image data DIN5 ordinarily stored in the memory MEM, may be ordinarily output to the plurality of data lines DL.

Figure 18:
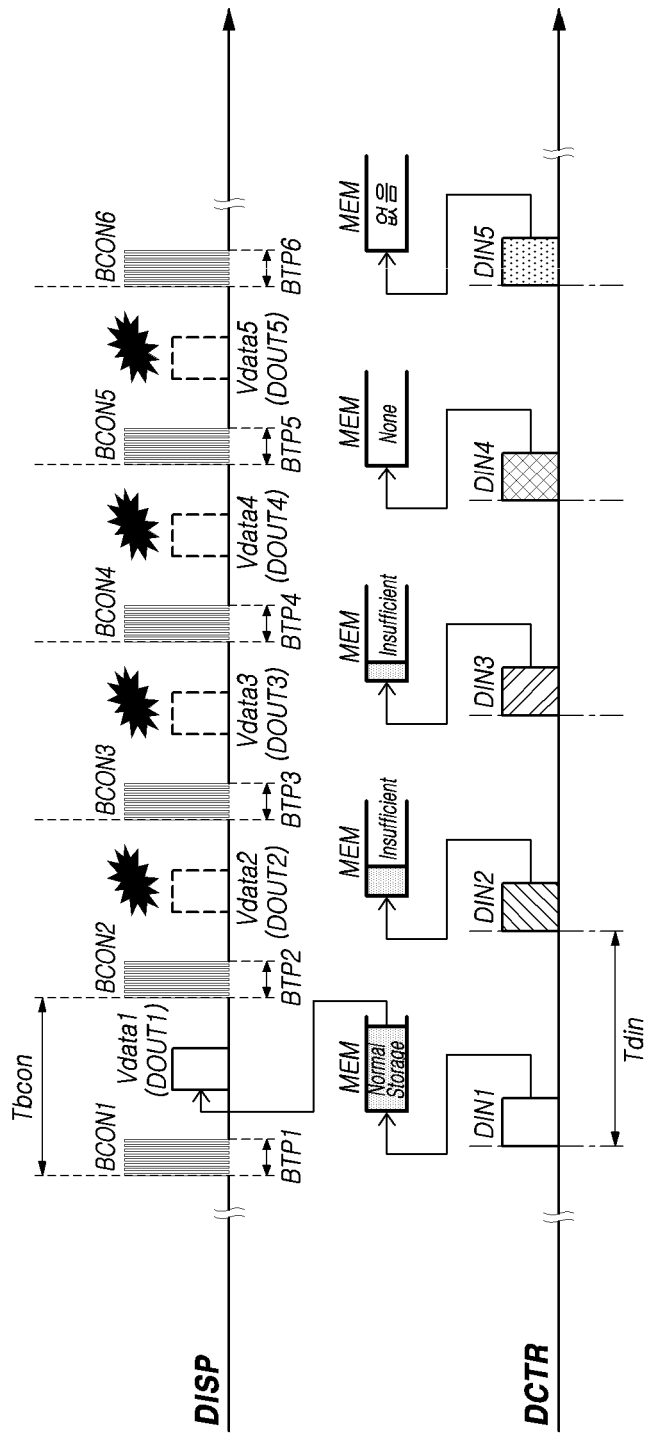
FIG. 18 is a signal diagram illustrating an abnormal data output situation in which data signals are non-ordinarily output to the display panel between two beacon transmission periods, due to the difference between the beacon cycle and the input cycle, in the touch display device according to exemplary embodiments.

FIG. 18 is a signal diagram illustrating an abnormal data output situation in which data signals are non-ordinarily output to the display panel DISP between two beacon transmission periods, due to the difference between the beacon cycle Tbcon and the input cycle Tdin, in the touch display device according to exemplary embodiments.

Referring to FIG. 18, in a case in which the beacon cycle Tbcon and the input cycle Tdin are different from each other, in particular, in which the beacon cycle Tbcon is shorter than the input cycle Tdin, the memory MEM of the display controller DCTR may be in a state in which the corresponding input image data is incompletely, and thus insufficiently, stored therein or the corresponding input image data is not stored therein at all. In this memory state, an abnormal data output situation, in which corresponding data signals are not ordinarily output between two beacon transmission periods, may occur.

Referring to the illustration of FIG. 18, after the first beacon signal BCON1 is output to the display panel DISP during the first beacon transmission period BTP1, before the second beacon transmission period BTP2, the first input image data DIN1 corresponding to a frame to be displayed on the display panel DISP is completely ordinarily stored in the memory MEM.

Accordingly, between the first beacon transmission period BTP1 and the second beacon transmission period BTP2, first data signals Vdata1, corresponding to the first input image data DIN1 regarding the corresponding first frame, may be ordinarily output to the display panel DISP.

In a case in which the beacon cycle Tbcon is shorter than input cycle Tdin, after the second beacon signal BCON2 is output to the display panel DISP during the second beacon transmission period BTP2, before the third beacon transmission period BTP3, the second input image data DIN2 corresponding to the second frame to be displayed on the display panel DISP is incompletely, and thus insufficiently, stored in the memory MEM.

Accordingly, during a period between the second beacon transmission period BTP2 and the third beacon transmission period BTP3, second data signals Vdata2, corresponding to the second input image data DIN2 regarding the corresponding second frame, are not ordinarily output to the display panel DISP.

This abnormal data output situation may occur continuously after the third beacon transmission period BTP3. This abnormal data output situation may significantly degrade image quality.

Hereinafter, a driving method able to remove abnormal data output situations despite the difference between the beacon cycle Tbcon and the input cycle Tdin will be described.

Figure 19:
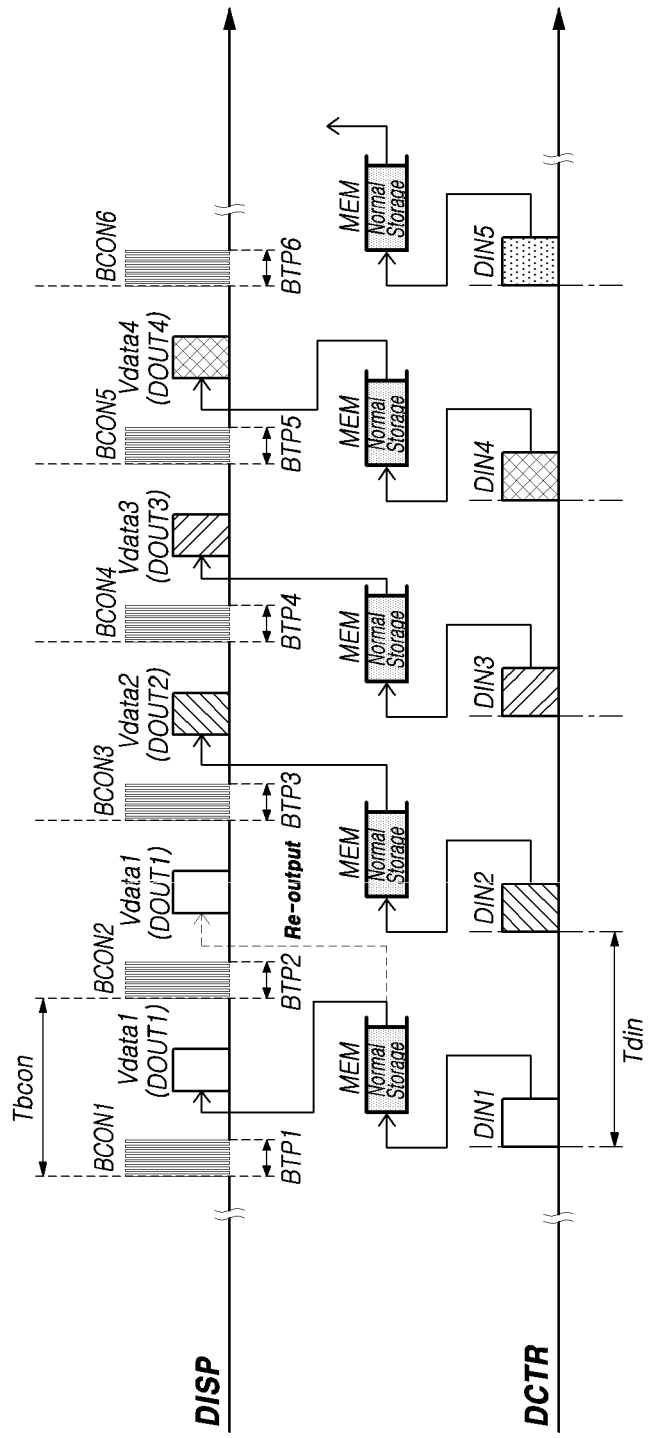
FIG. 19 is a signal diagram illustrating a driving method (i.e., a data re-output method) for solving an abnormal data output situation due to the difference between the beacon cycle and the input cycle in the touch display device according to exemplary embodiments.
Figure 20:
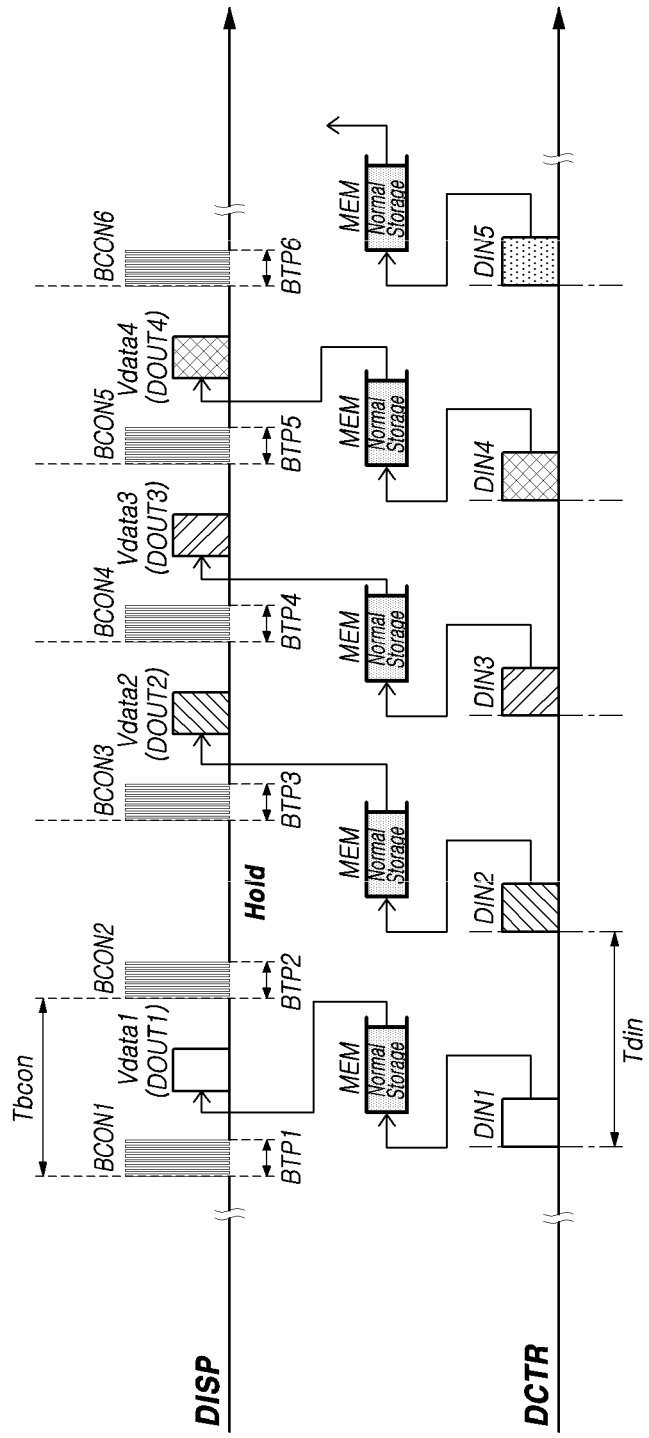
FIG. 20 is a signal diagram illustrating another driving method (i.e., a data output holding method) for solving an abnormal data output situation due to the difference between the beacon cycle and the input cycle in the touch display device according to exemplary embodiments.

FIG. 19 is a signal diagram illustrating a driving method (i.e., a data re-output method) for solving an abnormal data output situation due to the difference between the beacon cycle Tbcon and the input cycle Tdin in the touch display device according to exemplary embodiments, and FIG. 20 is a signal diagram illustrating another driving method (i.e., a data output holding method) for solving an abnormal data output situation due to the difference between the beacon cycle Tbcon and the input cycle Tdin in the touch display device according to exemplary embodiments.

Referring to FIGS. 19 and 20, the touch driving circuit TDC may output the first beacon signal BCON1 during the first beacon transmission period BTP1, output the second beacon signal BCON2 during the second beacon transmission period BTP2, and the third beacon signal BCON3 during the third beacon transmission period BTP3, according to the predetermined beacon cycle Tbcon.

The display controller DCTR may receive the first input image data DIN1, the second input image data DIN2, and the third input image data DIN3 input thereto, according to the input cycle Tdin corresponding to a value different from that of the beacon cycle Tbcon.

The display controller DCTR may store the first input image data DIN1, the second input image data DIN2, and the third input image data DIN3 in the memory MEM.

The display controller DCTR may output the first output image data DOUT1, the second output image data DOUT2, and the third output image data DOUT3 corresponding to the first input image data DIN1, the second input image data DIN2, and the third input image data DIN3 stored in the memory MEM.

The input cycle Tdin, in which the display controller DCTR receives the input image data DIN input thereto from the image supply device VDS, may be defined as a value greater than the beacon cycle Tbcon, in which the beacon signal BCON is output to the display panel DISP.

The beacon transmission periods BTP1 to BTP6 may correspond to blank periods.

All blank periods may or may not be beacon transmission periods.

In addition, the beacon signal BCON may be output to the display panel DISP in every blank period, or may be output to the display panel DISP in one blank period of every two or more display panels DISP.

In addition, the beacon signal BCON may be output to the display panel DISP in every one or more blank periods after a specific event has occurred.

In a case in which the beacon signal BCON is output to the display panel DISP in every blank period, the touch driving circuit TDC may output the first beacon signal BCON1, the second beacon signal BCON2, and the third beacon signal BCON3 to the first blank period, the second blank period, and the third blank period, respectively. That is, the first blank period, the second blank period, and the third blank period correspond to the first beacon transmission period BTP1, the second beacon transmission period BTP2, and the third beacon transmission period BTP3, respectively.

The beacon signal BCON may be output to the display panel DISP during the blank period so as not to overlap the active period, in which there may be significant fluctuations in the voltage of the display panel DISP. Thus, the beacon signal BCON may be reliably and ordinarily transferred to the pen, so that the pen can reliably and ordinarily obtain the pen driving control information necessary for the pen sensing. Accordingly, the pen can normally perform a downlink communications operation, so that the pen sensing can be performed ordinarily and accurately.

In a case in which the beacon signal BCON is output to the display panel DISP in every blank period, the beacon cycle Tbcon may correspond to the intervals of the blank periods.

The display controller DCTR may ordinarily output the first output image data DOUT1, corresponding to the first input image data DIN1 regarding the first frame completely stored in the memory MEM, between the first beacon transmission period BTP1 and the second beacon transmission period BTP2.

After the second beacon transmission period BTP2, during a period between the second beacon transmission period BTP2 and the third beacon transmission period BTP3, data output processing in the display controller DCTR may vary depending on the status in which the second input image data DIN2 regarding the second frame is stored in the memory MEM.

After the second beacon transmission period BTP2, if the second input image data DIN2 regarding the second frame is in an ordinary status, i.e., the second input image data DIN2 is completely stored in the memory MEM, the display controller DCTR may output the second output image data DOUT2, corresponding to the second input image data DIN2 regarding the second frame, between the second beacon transmission period BTP2 and the third beacon transmission period BTP3, as illustrated in FIG. 17.

After the second beacon transmission period BTP2, if the second input image data DIN2 regarding the second frame is in an abnormal status, i.e., the second input image data DIN2 is not stored in the memory MEM at all or is insufficiently stored in the memory MEM, the display controller DCTR may re-output the first output image data DOUT1 having already been output, as illustrated in FIG. 19.

The display controller DCTR may re-output the first output image data DOUT1, having already been output, in a one-frame period, until the second input image data DIN2 is completely stored in the memory MEM.

In the illustration of FIG. 19, the display controller DCTR has performed the data output processing of the data regarding the previous frame during the one-frame period. However, in some cases, the data output processing of the data regarding the previous frame may be performed during a period of two or more frames.

After the second beacon transmission period BTP2, if the second input image data DIN2 regarding the second frame is in the abnormal status, i.e., the second input image data DIN2 is not stored in the memory MEM at all or is insufficiently stored in the memory MEM, the display controller DCTR may hold the data output processing during a period between the second beacon transmission period BTP2 and the third beacon transmission period BTP3, as illustrated in FIG. 20.

The display controller DCTR may hold the data output processing during the period of one or more frames, until the second input image data DIN2 is completely stored in the memory MEM.

In the illustration of FIG. 20, the display controller DCTR has performed the data output holding during the one-frame period. However, in some cases, the data output holding may be performed during the period of two or more frames.

Referring to FIGS. 19 and 20, if the second input image data DIN2 is completely stored in the memory MEM in or directly after the third beacon transmission period BTP3 as the display controller DCTR re-output the first output image data DOUT1 or held the data output processing between the second beacon transmission period BTP2 and the third beacon transmission period BTP3, the display controller DCTR may resume and ordinarily perform the data output processing until another abnormal memory status occurs.

In other words, if the second input image data DIN2 is completely stored in the memory MEM in or directly after the third beacon transmission period BTP3, due to the display controller DCTR having re-output the first output image data DOUT1 or having held the data output processing between the second beacon transmission period BTP2 and the third beacon transmission period BTP3, the display controller DCTR may output, for example, the second output image data DOUT2 and the output image data DOUT3 according to the output cycle Tdout corresponding to the predetermined beacon cycle Tbcon, delayed by a one-frame period (corresponding to the output cycle Tdout and the beacon cycle Tbcon) from a predetermined period, after the third beacon signal BCON3 is output during the third beacon transmission period BTP3 according to the predetermined beacon cycle Tbcon.

As illustrated in FIG. 19, in a case in which the display controller DCTR re-outputs the first output image data DOUT1 between the second beacon transmission period BTP2 and the third beacon transmission period BTP3, the gate driving circuit GDC may sequentially turn the plurality of gate lines GL on by ordinarily performing sequential gate driving.

As illustrated in FIG. 20, in a case in which the display controller DCTR holds the data output processing between the second beacon transmission period BTP2 and the third beacon transmission period BTP3, the gate driving circuit GDC may turn the plurality of gate lines GL off.

As illustrated above, the beacon signal BCON may be a pulse-modulated signal, comprised of a plurality of pulses, and in which information for the pen sensing (e.g., the pen driving control information) is expressed. The plurality of pulses of the beacon signal BCON may not have the same pulse width. Here, the pulse width of each of the pulses may correspond, for example, to information to be expressed.

In addition, referring to FIGS. 19 and 20, the touch driving circuit TDC may output the fourth beacon signal BCON4 and the fifth beacon signal BCON5 to the beacon cycle Tbcon at different timing from the first beacon signal BCON1, the second beacon signal BCON2, and the third beacon signal BCON3.

For example, the period between the fourth beacon transmission period BTP4, in which the fourth beacon signal BCON4 is output, and the fifth beacon transmission period BTP5, in which the fifth beacon signal BCON5 is output, may be a period of the finger sensing F/S or a period of the pen sensing P/S.

If the period between the fourth beacon transmission period BTP4 and the fifth beacon transmission period BTP5 is the period of the pen sensing P/S, the touch circuit TC may supply a DC voltage to one or more touch electrodes TE among the plurality of touch electrodes TE during the period between the fourth beacon transmission period BTP4 and the fifth beacon transmission period BTP5.

Consequently, the touch circuit TC may receive a pens signal from the pen through one or more touch electrodes TE disposed in the display panel DISP while the DC voltage is being supplied to the one or more touch electrodes TE among the plurality of touch electrodes TE.

Here, the pen signal may be the pen position detection signal POS allowing the touch circuit TC to detect at least one of the position of the pen or the tilt of the pen or the pen data signal PDATA allowing the touch circuit TC to detect the pressure (writing pressure) of the pen or various additional pieces of information of the pen.

Between the fourth beacon transmission period BTP4 and the fifth beacon transmission period BTP5, the touch circuit TC may supply a driving synchronization signal corresponding to the uplink signal to one or more touch electrodes TE among the plurality of touch electrodes TE before supplying the DC voltage to the one or more touch electrodes TE among the plurality of touch electrodes TE.

The driving synchronization signal, supplied to the display panel DISP before the DC voltage is supplied to the one or more touch electrodes TE among the plurality of touch electrodes TE, may be the ping signal PING including a single pulse or two or more pulses having a pulse width predetermined for pen driving synchronization.

The use of the ping signal PING allows the touch display device and the pen to work in concert with each other in more accurate timing, i.e., at more accurate points in time.

Referring to FIGS. 19 and 20, since the period between the fourth beacon transmission period BTP4 and the fifth beacon transmission period BTP5 is the period of the pen sensing P/S, when the DC voltage (serving as a common voltage in the form of a DC voltage, and corresponding to the second touch electrode driving signal TDS2) is supplied to the plurality of touch electrodes TE during the period between the fourth beacon transmission period BTP4 and the fifth beacon transmission period BTP5, the third data signal Vdata3 has the form of the data signal of Case 2 in FIG. 10.

If the period between the fourth beacon transmission period BTP4 and the fifth beacon transmission period BTP5 is the period of the finger sensing F/S, the touch circuit TC may supply the first touch electrode driving signal TDS1 having the first amplitude AMP1 to one or more touch electrodes TE among the plurality of touch electrodes TE during the period between the fourth beacon transmission period BTP4 and the fifth beacon transmission period BTP5.

Accordingly, the touch circuit TC may detect a change in capacitance in the one or more touch electrodes TE, to which the first touch electrode driving signal TDS1 having the first amplitude AMP1 is supplied, and thus, detect a finger touch or touch coordinates.

Referring to FIGS. 19 and 20, since the period between the fourth beacon transmission period BTP4 and the fifth beacon transmission period BTP5 is the period of the finger sensing F/S, when the first touch electrode driving signal TDS1 having the first amplitude AMP1 is supplied to the plurality of touch electrodes TE during the period between the fourth beacon transmission period BTP4 and the fifth beacon transmission period BTP5, the third data signal Vdata3 has the shape of the data signal of Case 1 in FIG. 10.

In addition, referring to FIGS. 19 and 20, during the period between the first beacon transmission period BTP1 and the second beacon transmission period BTP2, the display controller DCTR may output the first output image data DOUT1 to the data driving circuit DDC, and the data driving circuit DDC may convert the first output image data DOUT1, in the form of digital signals, into the first data signals Vdata1, in the form of analog signals, and output the first data signals Vdata1 to the plurality of data lines DL.

If the period between the fourth beacon transmission period BTP4 and the fifth beacon transmission period BTP5 is the period of the finger sensing F/S, the touch driving circuit TDC may output the first touch electrode driving signal TDS1, swinging with the first amplitude AMP1, to one or more touch electrodes TE among the plurality of touch electrodes TE.

In this case, the data driving circuit DDC may output the first data signals Vdata1 having a voltage change according to the first amplitude AMP1 of the first touch electrode driving signal TDS1 (Case 1). That is, during the period between the first beacon transmission period BTP1 and the second beacon transmission period BTP2, the first data signals Vdata1 may have a voltage changed by a value equal to the first amplitude AMP1 of the first touch electrode driving signal TDS1.

Accordingly, even in the case that both the display processing and the finger sensing are simultaneously performed as in Case 1, both the finger sensing and the display processing can be performed ordinarily.

During the period between the first beacon transmission period BTP1 and the second beacon transmission period BTP2, in a case in which both the display processing and the finger sensing are simultaneously performed (Case 1), the gate driving circuit GDC sequentially outputs the gate signals Vgate to the plurality of gate lines GL, in which each of the gate signals Vgate may include a turn-on signal portion and a turn-off signal portion.

As illustrated in FIGS. 11 and 12, the turn-off signal portion of each of the gate signals Vgate may be a modulated turn-off gate voltage VGL_M swinging with the first amplitude AMP1 of the first touch electrode driving signal TDS1.

As illustrated in FIGS. 11 and 12, the turn-on signal portion of each of the gate signals Vgate may be a modulated turn-on gate voltage VGH_M swinging with the amplitude of the first touch electrode driving signal TDS1. The modulated turn-on gate voltage VGH_M has a voltage difference of $\Delta$Vgate from the modulated turn-off gate voltage VGL_M.

The display controller DCTR according to exemplary embodiments may include: the data input section DIM receiving the first input image data DIN1, the second input image data DIN2, and the third input image data DIN3 input thereto according to the predetermined input cycle Tdin; the memory MEM storing the first input image data DIN1, the second input image data DIN2, and the third input image data DIN3; and the data output section DOM outputting the first output image data DOUT1, the second output image data DOUT2, and the third output image data DOUT3, corresponding to the first input image data DIN1, the second input image data DIN2, and the third input image data DIN3, respectively, to the data driving circuit DDC.

The input cycle Tdin may be defined as a value different from the beacon cycle Tbcon, in which the beacon signal BCON is output to one or more touch electrodes TE disposed in the display panel DISP.

The beacon signal BCON may be a signal transferred to one or more pen in contact with or adjacent to the display panel DISP.

The data output section DOM may output the first output image data DOUT1 between the first beacon transmission period BTP1, in which the first beacon signal BCON1 is output to the display panel DISP, and the second beacon transmission period BTP2, in which the second beacon signal BCON2 is output to the display panel DISP.

The data output section DOM must output the second output image data DOUT2 between the second beacon transmission period BTP2, in which the second beacon signal BCON2 is output to the display panel DISP, and the third beacon transmission period BTP3, in which the third beacon signal BCON3 is output to the display panel DISP.

If the second output image data DOUT2 is not completely stored in the memory MEM, the data output section DOM may perform the data re-output processing to output the first output image data DOUT1 again (see FIG. 19) or hold the data output processing (see FIG. 20).

The driving circuit according to exemplary embodiments may include: the data driving circuit DDC receiving the output image data DOUT in the form of digital signals, converting the output image data DOUT into the data signals Vdata in the form of analog signals, and output the data signals Vdata to the plurality of data lines DL to drive the plurality of data lines DL disposed in the display panel DISP; and the touch driving circuit TDC outputting the beacon signal BCON, directed to one or more pens in contact with or adjacent to the display panel DISP, to one or more touch electrodes TE among the plurality of touch electrodes TE disposed in the display panel DISP.

The touch driving circuit TDC may output the first beacon signal BCON1 during the first beacon transmission period BTP1, the second beacon signal BCON2 during the second beacon transmission period BTP2, and the third beacon signal BCON3 during the third beacon transmission period BTP3 according to the predetermined beacon cycle Tbcon.

The data driving circuit DDC may output the first data signals Vdata1 between the first beacon transmission period BTP1 and the second beacon transmission period BTP2.

The data driving circuit DDC may output the second data signals Vdata2 following the first data signals Vdata1, re-output the first data signals Vdata1, or hold the data output processing between the second beacon transmission period BTP2 and the third beacon transmission period BTP3.

The driving circuit according to exemplary embodiments may include one or more data driving circuit DDC and one or more touch driving circuits TDC, each of which is implemented as an integrated circuit (IC). In some cases, the driving circuit according to exemplary embodiments may be implemented as a combined IC in which one or more data driving circuit DDC and one or more touch driving circuits TDC are combined.

In addition, the touch display device according to exemplary embodiments may include: the display panel DISP in which the plurality of data lines DL and the plurality of gate lines GL are disposed, and the plurality of touch electrodes TE are disposed; the gate driving circuit GDC electrically connected to the display panel DISP, and sequentially outputting gate signals Vgate to the plurality of gate lines GL to drive the plurality of gate lines GL; the data driving circuit DDC electrically connected to the display panel DISP, and receiving output image data DOUT in the form of a digital signal, converting the output image data DOUT into analog data signals Vdata, and outputting the analog data signals Vdata to the plurality of data lines DL to drive the plurality of data lines DL; and the touch driving circuit TDC outputting the beacon signal BCON to one or more touch electrodes TE among the plurality of touch electrodes TE.

The touch driving circuit TDC may output the beacon signal BCON in every blank period between active periods in which images are displayed.

During one or more active periods among two or more active periods, the data driving circuit DDC may hold the output of the second data signals Vdata2 or repeatedly output the first data signals Vdata1 that have been output in the previous active period.

Hereinafter, in a case in which the beacon signal BCON is output in every blank period according to the fixed beacon cycle Tbcon, a holding method of removing an abnormal data output situation in the data output processing will be described by way of example.

Figure 21:
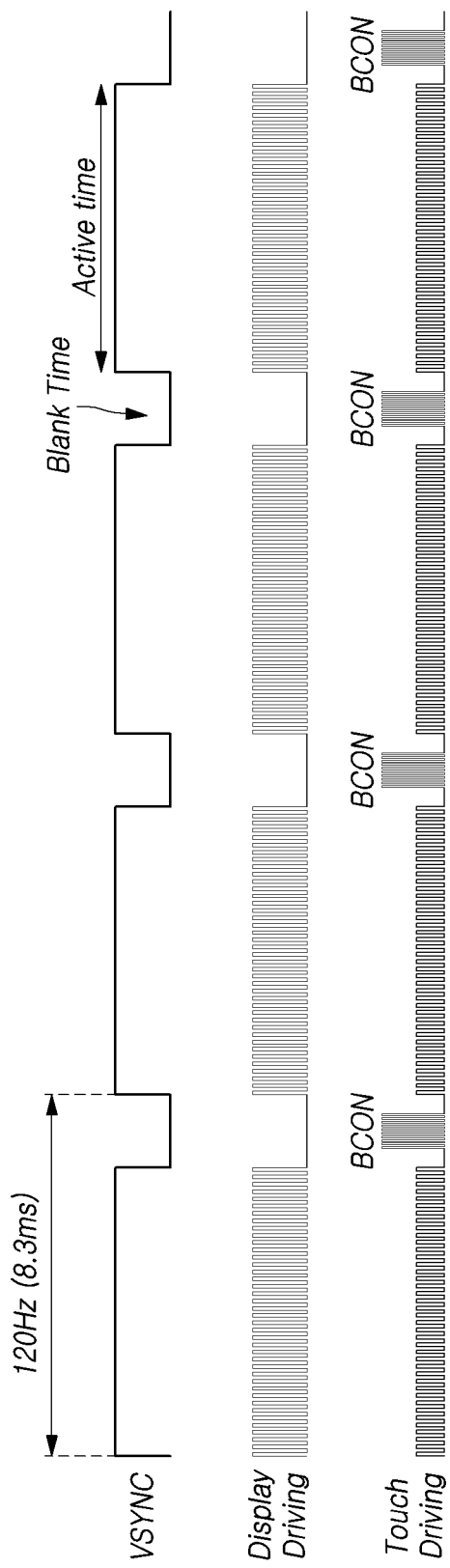
FIG. 21 is a driving timing diagram of a frame rate 120 Hz and a beacon output frequency 120 Hz in the touch display device according to exemplary embodiments.
Figure 22:
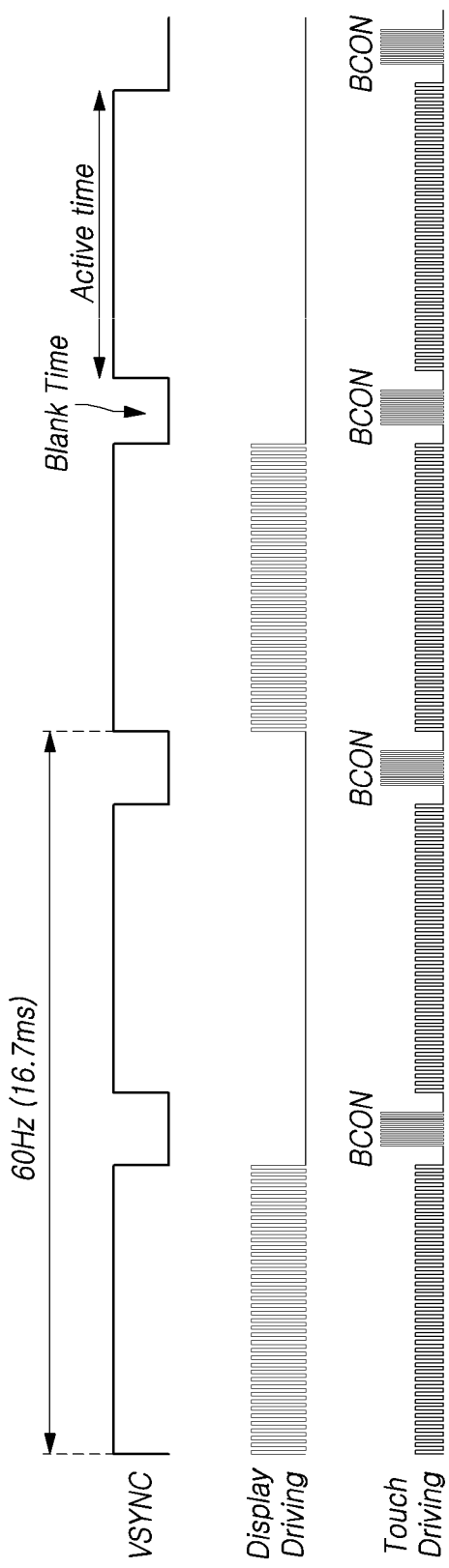
FIG. 22 is a driving timing diagram of a frame rate 60 Hz and a beacon output frequency 120 Hz in the touch display device according to exemplary embodiments.
Figure 23:
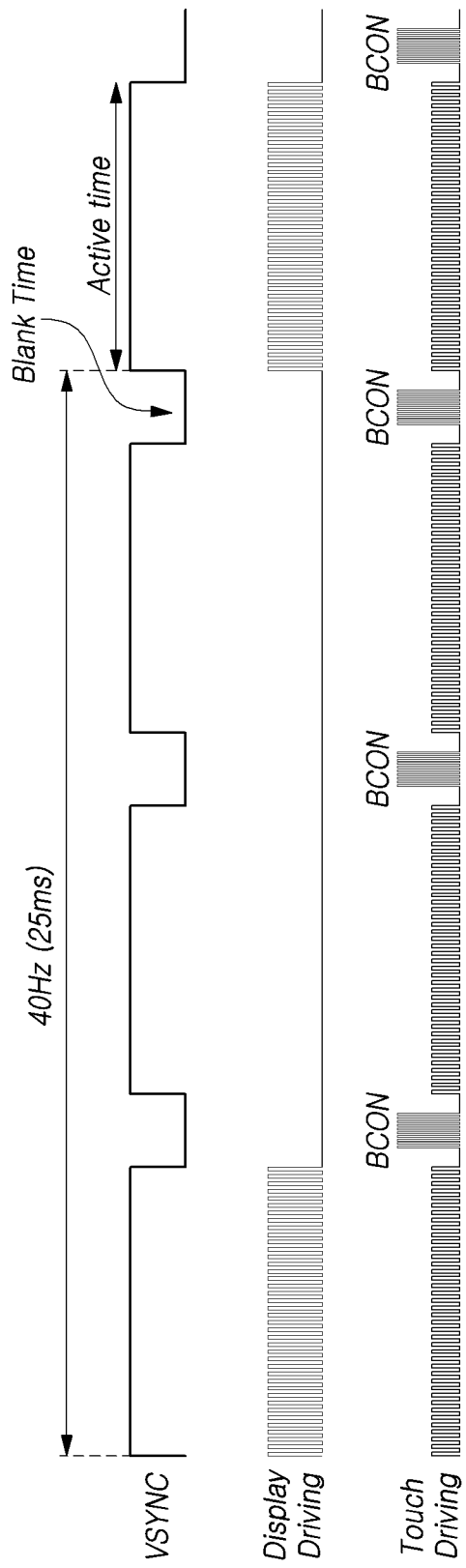
FIG. 23 is a driving timing diagram of a frame rate 40 Hz and a beacon output frequency 120 Hz in the touch display device according to exemplary embodiments.

FIG. 21 is a driving timing diagram of a frame rate 120 Hz and a beacon output frequency 120 Hz in the touch display device according to exemplary embodiments, FIG. 22 is a driving timing diagram of a frame rate 60 Hz and a beacon output frequency 120 Hz in the touch display device according to exemplary embodiments, and FIG. 23 is a driving timing diagram of a frame rate 40 Hz and a beacon output frequency 120 Hz in the touch display device according to exemplary embodiments.

FIGS. 21 to 23 are driving signal diagrams conceptually illustrating a beacon signal BCON applied to the display panel DISP during blank periods (or blank times) and a display driving signal (i.e., data signals) and a touch driving signal (i.e., a touch electrode driving signal or pen signal) applied to the display panel DISP during active periods (or active times), with respect to a vertical synchronization signal VSYNC defining the active periods and the blank periods.

Referring to FIG. 21, in the case in which the frame rate is 120 Hz and the beacon output frequency is 120 Hz, the touch display device according to exemplary embodiments may perform normal data output processing (i.e., display driving) and normal beacon signal output processing, since the frame rate is the same as the beacon output frequency.

Even in the case of frame rates lower than 120 Hz, as illustrated in FIGS. 22 and 23, the touch display device according to exemplary embodiments may constantly maintain the blank periods at regular intervals by rapidly performing the data output processing (or display driving) at 120 Hz and holding the data output processing (or display driving) during a one-frame period, as illustrated in FIG. 22, or holding data output processing (or display driving) during a two-frame period (i.e., a period of two frames), as illustrated in FIG. 23. Accordingly, the beacon signal BCON may be output to the display panel DISP according to the fixed beacon cycle Tbcon.

Figure 24:
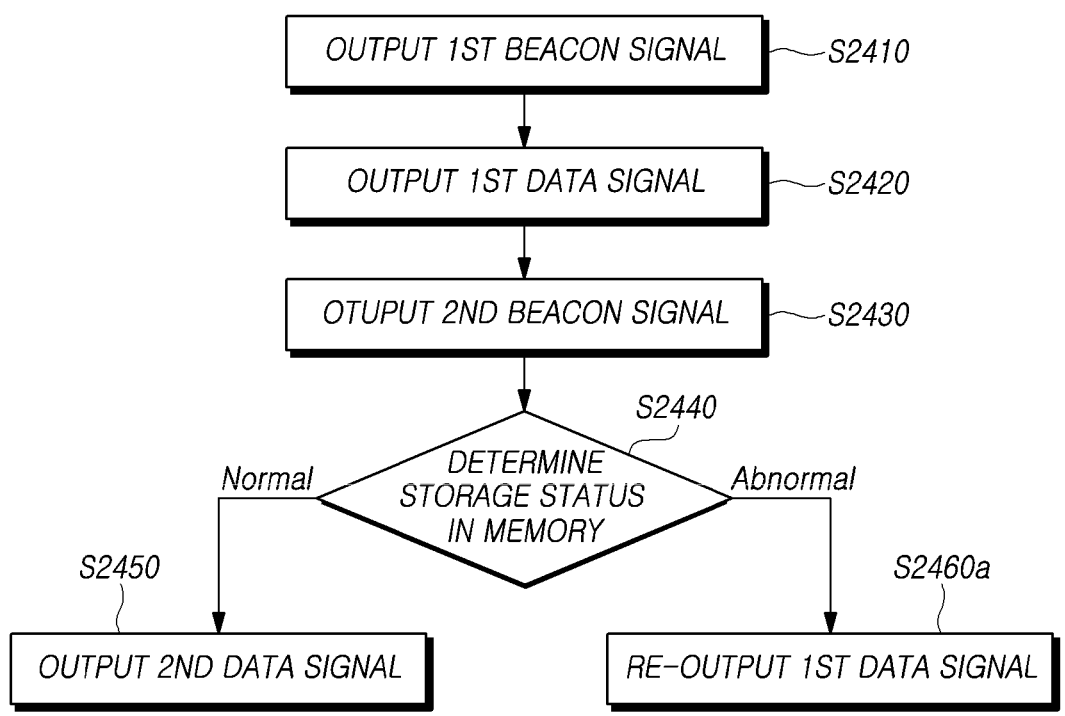
FIG. 24 is a flowchart illustrating a driving method of the touch display device according to exemplary embodiments.

FIG. 24 is a flowchart illustrating a driving method of the touch display device according to exemplary embodiments.

Referring to FIG. 24, the driving method of the touch display device according to exemplary embodiments may include: a step S2410 of outputting a first beacon signal BCON1, directed to one or more pens in contact with or adjacent to the display panel DISP, to one or more touch electrodes TE among the plurality of touch electrodes TE; a step s2420 of outputting, by the data driving circuit DDC, first data signals Vdata1 to the plurality of data lines DL after the first beacon signal BCON1 is output; and a step S2430 of outputting, by the touch driving circuit TDC, a second beacon signal BCON2 to one or more touch electrodes TE among the plurality of touch electrodes TE after the first data signals Vdata1 are output.

After the step S2430, a step S2440 of determining a storage status of input data in the memory MEM may be performed.

After the second beacon signal BCON2 is output, according to the storage status of input data in the memory determined in step S2440, a step S2450 of outputting second data signals Vdata2, following the first data signals Vdata1, to the plurality of data lines DL or a step S2460a of re-outputting the first data signals Vdata1 to the plurality of data lines DL may be performed.

Figure 25:
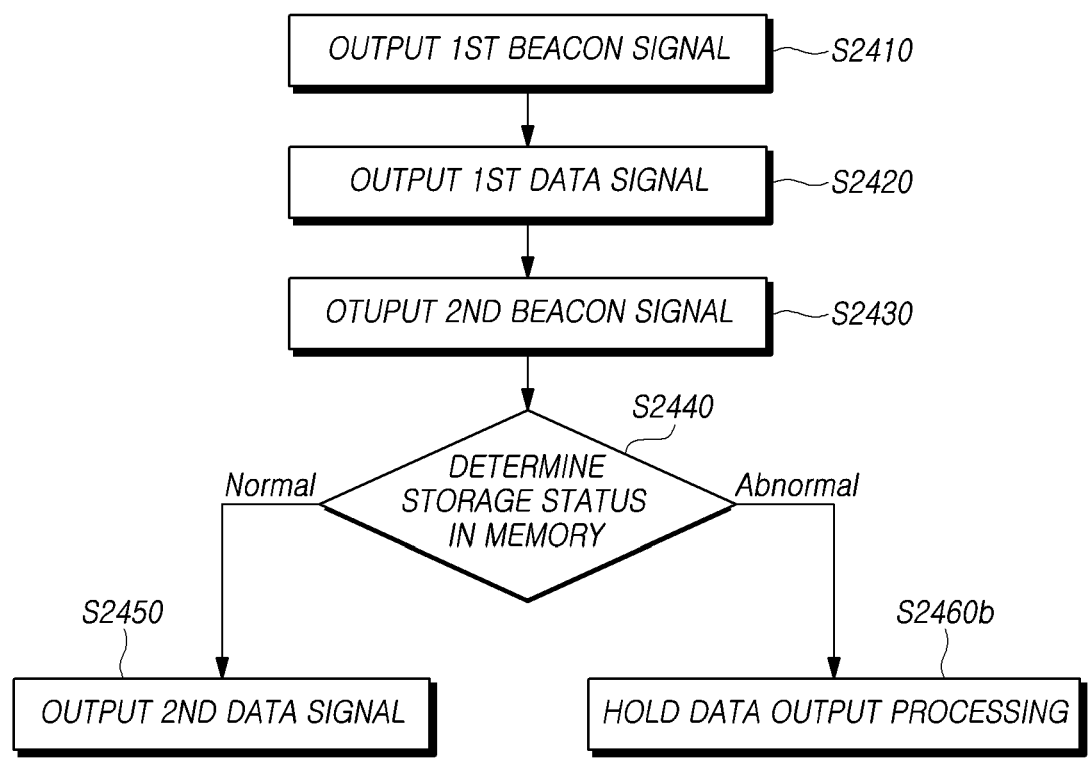
FIG. 25 is a flowchart illustrating another driving method of the touch display device according to exemplary embodiments.

FIG. 25 is a flowchart illustrating another driving method of the touch display device according to exemplary embodiments.

Referring to FIG. 25, the driving method of the touch display device according to exemplary embodiments may include a step S2410 of outputting, by the touch driving circuit TDC, a first beacon signal BCON1, directed to one or more pens in contact with or adjacent to the display panel DISP, to one or more touch electrodes TE among the plurality of touch electrodes TE; a step S2420 of outputting, by the data driving circuit DDC, first data signals Vdata1 to the plurality of data lines DL after the first beacon signal BCON1 is output; a step S2430 of outputting, by the touch driving circuit TDC, a second beacon signal BCON2 to one or more touch electrodes TE among the plurality of touch electrodes TE after the first data signals Vdata1 are output.

After the step S2430, a step S2440 of determining a storage status of input data in the memory MEM may be performed.

After the second beacon signal BCON2 is output, according to the storage status of input data in the memory determined in step S2440, a step S2450 of outputting second data signals Vdata2, following the first data signals Vdata1, to the plurality of data lines DL or a step S2460b of holding data output processing may be performed.

As set forth above, according to exemplary embodiments, the touch display device, the display controller, the driving circuit, and the driving method can properly synchronize the driving timing for the display processing and the driving timing for the touch sensing for detecting a touch performed by a user using a finger, a pen, etc., so that the display processing and the touch sensing can be performed ordinarily.

According to exemplary embodiments, the touch display device, the display controller, the driving circuit, and the driving method can ordinarily perform the display processing and the touch sensing (e.g., pen sensing or finger sensing) even in the case that a rate (or an input cycle) at which an image supply device supplies image data is not synchronized with a rate (or a beacon cycle) at which a beacon signal for the pen sensing is output to the display panel.

According to exemplary embodiments, the touch display device, the display controller, the driving circuit, and the driving method can ordinarily perform the display processing and the touch sensing (e.g., pen sensing or finger sensing), even in the case that the rate (or the input cycle) at which the image supply device supplies image data is not synchronized with a rate (or an output cycle) at which data signals are output to the display panel for the display operation.

According to exemplary embodiments, the touch display device, the display controller, the driving circuit, and the driving method can ordinarily perform the pen sensing and the display processing in a case in which the display processing and the touch sensing are performed independently of each other (or in a case in which the display processing and the touch sensing are simultaneously performed, if desired).

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
  a display panel including a plurality of data lines, a plurality of gate lines, and a plurality of touch electrodes;
  a gate driving circuit electrically connected to the display panel, the gate driving circuit configured to sequentially output gate signals to the plurality of gate lines to drive the plurality of gate lines;

a data driving circuit electrically connected to the display panel, the data driving circuit configured to receive digital output image data, and configured to convert the digital output image data into analog data signals, and configured to output the analog data signals to the plurality of data lines to drive the plurality of data lines;

a touch driving circuit configured to output a beacon signal, directed to one or more pens in contact with or adjacent to the display panel, to one or more touch electrodes among the plurality of touch electrodes, and the touch driving circuit configured to output a first beacon signal during a first beacon transmission period, a second beacon signal during a second beacon transmission period, and a third beacon signal during a third beacon transmission period, according to a predetermined beacon cycle; and a display controller configured to store input image data in a memory and configured to output image data, corresponding to the input image data stored in the memory, to the data driving circuit, and wherein the display controller is further configured to:

receive first input image data, second input image data, and third input image data according to an input cycle corresponding to a different value from the beacon cycle;

output first output image data, second output image data, and third output image data corresponding to the first input image data, the second input image data, and the third input image data, respectively;

output the first output image data between the first beacon transmission period and the second beacon transmission period; and output the second output image data, re-output the first output image data, or hold data output processing between the second beacon transmission period and the third beacon transmission period.

2. The touch display device according to claim 1, wherein, if the first output image data is re-output or the data output processing is held between the second beacon transmission period and the third beacon transmission period, the display controller is configured to output the second output image data and the third output image data according to an output cycle corresponding to the beacon cycle after the third beacon signal is output.

3. The touch display device according to claim 1, wherein, if the display controller holds the data output processing between the second beacon transmission period and the third beacon transmission period, the gate driving circuit turns the plurality of gate lines off.

4. The touch display device according to claim 1, wherein, if the display controller re-outputs the first output image data between the second beacon transmission period and the third beacon transmission period, the gate driving circuit sequentially turns the plurality of gate lines on.

5. The touch display device according to claim 1, wherein the input cycle is defined as a value greater than the beacon cycle.

6. The touch display device according to claim 1, wherein the beacon cycle corresponds to an interval of blank periods.

7. The touch display device according to claim 1, wherein the touch driving circuit outputs the first beacon signal, the second beacon signal, and the third beacon signal in a first blank period, a second blank period, and a third blank period, respectively.

8. The touch display device according to claim 1, wherein the beacon signal is a pulse-modulated signal comprising a plurality of pulses including information for pen sensing.

9. The touch display device according to claim 1, wherein the touch driving circuit is configured to output a fourth beacon signal and a fifth beacon signal at a different timing from the first beacon signal, the second beacon signal, and the third beacon signal, and is configured to supply a direct current voltage to the one or more touch electrodes among the plurality of touch electrodes between a fourth beacon transmission period in which the fourth beacon signal is output and a fifth beacon transmission period in which the fifth beacon signal is output.

10. The touch display device according to claim 9, wherein, while the touch driving circuit is supplying the direct current voltage to the one or more touch electrodes among the plurality of touch electrodes, the touch driving circuit receives one or more pen signals output from the one or more pens via the display panel.

11. The touch display device according to claim 9, wherein, between the fourth beacon transmission period and the fifth beacon transmission period, the touch driving circuit supplies a driving synchronization signal to the one or more touch electrodes among the plurality of touch electrodes before supplying the direct current voltage to the one or more touch electrodes among the plurality of touch electrodes.

12. The touch display device according to claim 11, wherein the driving synchronization signal is a ping signal comprising one or more pulses having a predetermined pulse width.

13. The touch display device according to claim 1, wherein, during a period between the first beacon transmission period and the second beacon transmission period, the display controller outputs the first output image data to the data driving circuit, the display controller converts the first output image data, in a form of digital signals, into analog first data signals, and outputs the analog first data signals to the plurality of data lines, and the touch driving circuit outputs a touch electrode driving signal with a predetermined amplitude to the one or more touch electrode among the plurality of touch electrodes.

14. The touch display device according to claim 13, wherein, during the period between the first beacon transmission period and the second beacon transmission period, the first data signals have a voltage changed by a value equal to the amplitude of the touch electrode driving signal.

15. The touch display device according to claim 13, wherein, during the period between the first beacon transmission period and the second beacon transmission period:

the gate driving circuit sequentially outputs the gate signals to the plurality of gate lines;

a turn-off signal portion of each of the gate signals being a modulated turn-off gate voltage swinging with the amplitude of the touch electrode driving signal; and a turn-on signal portion of each of the gate signals being a modulated turn-on gate voltage swinging with the amplitude of the touch electrode driving signal.

16. A touch display device, comprising:

a display panel in which a plurality of data lines, a plurality of gate lines, and a plurality of touch electrodes are disposed;

a gate driving circuit electrically connected to the display panel, the gate driving circuit sequentially outputting gate signals to the plurality of gate lines to drive the plurality of gate lines;

a data driving circuit electrically connected to the display panel, the data driving circuit receiving output image data, in a form of digital signals according to a predetermined input cycle, converting the output image data into analog data signals, and outputting the analog data signals to the plurality of data lines to drive the plurality of data lines, and the data driving circuit holding output of the analog data signals or repeatedly outputting the analog data signals having already been output in a previous active period in which images are displayed, during one or more active periods among two or more active periods; and a touch driving circuit outputting a beacon signal to one or more touch electrodes among the plurality of touch electrodes, the touch driving circuit outputting a beacon signal in every blank period between the active periods in which images are displayed, according to a beacon cycle having a different value from the input cycle.

17. A display controller of a touch display device including a display panel in which a plurality of data lines, a plurality of gate lines, and a plurality of touch electrodes are disposed, and a data driving circuit driving the plurality of data lines, the display controller comprising:

a data input section receiving first input image data, second input image data, and third input image data according to a predetermined input cycle;

a memory storing the first input image data, the second input image data, and the third input image data; and a data output section outputting first output image data, second output image data, and third output image data corresponding to the first input image data, the second input image data, and the third input image data to the data driving circuit, wherein the predetermined input cycle is defined as a value different from a beacon cycle in which a beacon signal is output to one or more touch electrodes among the plurality of touch electrodes disposed in the display panel, wherein the beacon signal is a signal directed to one or more pens in contact with or adjacent to the display panel, wherein the data output section outputs the first output image data between a first beacon transmission period in which a first beacon signal is output to the display panel and a second beacon transmission period in which a second beacon signal is output to the display panel, and wherein the data output section holds data output processing or re-outputs the first output image data between the second beacon transmission period in which the second beacon signal is output to the display panel and a third beacon transmission period in which a third beacon signal is output to the display panel.

18. The display controller according to claim 17, wherein the data output section outputs the second output image data and the third output image data according to an output cycle corresponding to the beacon cycle after the third beacon signal is output.

19. The display controller according to claim 17, wherein the input cycle is greater than the beacon cycle.

20. A driving circuit, comprising:

a data driving circuit receiving output image data, in a form of digital signals according to a predetermined input cycle, converting the output image data into analog data signals, and outputting the analog data signals to a plurality of data lines to drive the plurality of data lines disposed in a display panel; and a touch driving circuit outputting a beacon signal, which is directed to one or more pens in contact with or adjacent to the display panel, to one or more touch electrodes among a plurality of touch electrodes disposed in the display panel, wherein the touch driving circuit outputs a first beacon signal during a first beacon transmission period, a second beacon signal during a second beacon transmission period, and a third beacon signal during a third beacon transmission period, according to a beacon cycle having a different value from the input cycle, and wherein the data driving circuit outputs first data signals between the first beacon transmission period and the second beacon transmission period, and outputs second data signals following the first data signals, re-outputs the first data signals, or holds data output processing between the second beacon transmission period and the third beacon transmission period.

21. The driving circuit according to claim 20, wherein, if the first data signals are re-output or the data output processing is held between the second beacon transmission period and the third beacon transmission period, the data driving circuit outputs the second data signals following the first data signals according to an output cycle corresponding to the beacon cycle after the third beacon signal is output.

22. The driving circuit according to claim 20, wherein the touch driving circuit outputs a fourth beacon signal and a fifth beacon signal in a different timing from the first beacon signal, the second beacon signal, and the third beacon signal, and supplies a direct current voltage to the one or more touch electrodes among the plurality of touch electrodes between a fourth beacon transmission period in which the fourth beacon signal is output and a fifth beacon transmission period in which the fifth beacon signal is output.

23. The driving circuit according to claim 20, wherein, during a period between the first beacon transmission period and the second beacon transmission period:

the data driving circuit outputs the first data signals to the plurality of data lines; and the touch driving circuit outputs a touch electrode driving signal that varies with a predetermined amplitude to the one or more touch electrodes among the plurality of touch electrodes.

24. The driving circuit according to claim 23, wherein, during a period between the first beacon transmission period and the second beacon transmission period, the first data signals have a voltage changed by a value equal to an amplitude of the touch electrode driving signal.

25. A method of driving a touch display device including a display panel in which a plurality of data lines, a plurality of gate lines, and a plurality of touch electrodes are disposed, the method comprising:

outputting a first beacon signal, directed to one or more pens in contact with or adjacent to the display panel, to one or more touch electrodes among the plurality of touch electrodes according to a predetermined beacon cycle;

receiving output image data, in a form of digital signals according to an input cycle having a different value from the beacon cycle;

converting the output image data into analog data signals;

outputting first data signals to the plurality of data lines after the first beacon signal is output;

outputting a second beacon signal to the one or more touch electrodes among the plurality of touch electrodes after the first beacon signal is output; and after the second beacon signal is output, outputting second data signals to the plurality of data lines, re-outputting the first data signals to the plurality of data lines, or holding data output processing.

\* \* \* \* \*